United States Patent
Ford et al.

(10) Patent No.: US 6,885,924 B2
(45) Date of Patent: Apr. 26, 2005

(54) VEHICLE ATTITUDE ADJUSTMENT ASSEMBLY

(76) Inventors: Robert M. Ford, 6964 Granger, Troy, MI (US) 48098; Shawn P. Haley, 6018 Cheryl Ct., West Bloomfield, MI (US) 48324; John P. Manfreda, 14106 Brandywine, Sterling Heights, MI (US) 48312

( * ) Notice: Subject to any disclaimer, the term of this patent is extended or adjusted under 35 U.S.C. 154(b) by 52 days.

(21) Appl. No.: 10/318,820

(22) Filed: Dec. 13, 2002

(65) Prior Publication Data

US 2003/0135312 A1 Jul. 17, 2003

Related U.S. Application Data

(63) Continuation-in-part of application No. 09/528,614, filed on Mar. 20, 2000, now Pat. No. 6,584,385.
(60) Provisional application No. 60/157,310, filed on Oct. 1, 1999.

(51) Int. Cl.[7] .............................. B60S 9/00; B30R 16/02; B62D 55/00
(52) U.S. Cl. .............................. 701/36; 701/37; 180/41
(58) Field of Search .............................. 701/36, 110, 37, 701/38; 254/418, 423, 422; 180/41, 282, 89.15, 89.14, 9.52; 280/6.153, 6.15, 6.156, 763.1, 6.154, 6.159, 5.514

(56) References Cited

U.S. PATENT DOCUMENTS

| | | | |
|---|---|---|---|
| 3,606,247 A | 9/1971 | Liston | 254/86 H |
| 3,943,637 A | 3/1976 | Hanser | 34/56 |
| 4,061,309 A | 12/1977 | Hanser | 254/86 H |
| 4,148,125 A | 4/1979 | Hanser | 29/451 |
| 4,165,861 A | 8/1979 | Hanser | |
| 4,380,258 A | 4/1983 | Hanser | |
| 4,597,584 A | 7/1986 | Hanser | 280/6 R |
| 4,655,269 A | 4/1987 | Hanser et al. | 144/193 A |
| 4,743,037 A | 5/1988 | Hanser | 208/6 R |
| 4,746,133 A | 5/1988 | Hanser et al. | 280/6 R |
| 5,143,386 A | 9/1992 | Uriarte | 280/6.1 |
| 5,176,391 A | 1/1993 | Schneider et al. | 280/6.1 |
| 5,188,379 A | 2/1993 | Krause et al. | 280/6.12 |
| 5,337,847 A * | 8/1994 | Woods et al. | 180/9.52 |
| 5,511,459 A | 4/1996 | Hanser et al. | 91/171 |
| 5,547,040 A | 8/1996 | Hanser et al. | 182/88 |
| 5,628,521 A | 5/1997 | Schneider et al. | 280/6.1 |
| 5,652,703 A * | 7/1997 | Kawazoe | 701/37 |
| 5,676,385 A | 10/1997 | Schneider et al. | 280/6.1 |
| 5,772,270 A | 6/1998 | Hanser et al. | 296/26 |
| 5,890,721 A | 4/1999 | Schneider et al. | 280/6.153 |
| 5,901,969 A | 5/1999 | Schneider et al. | 280/6.153 |
| 5,908,215 A | 6/1999 | Hanser et al. | 296/26.15 |
| 5,913,525 A | 6/1999 | Schneider et al. | 280/6.153 |
| 5,988,654 A * | 11/1999 | Wix et al. | 280/6.15 |
| 6,002,975 A * | 12/1999 | Schiffmann et al. | 701/36 |
| 6,050,573 A | 4/2000 | Kunz | 280/6.153 |
| 6,176,495 B1 * | 1/2001 | Decker | 280/6.153 |

* cited by examiner

*Primary Examiner*—Thomas G. Black
*Assistant Examiner*—Dalena Tran
(74) *Attorney, Agent, or Firm*—Reising, Ethington, Barnes, Kisselle, P.C.

(57) ABSTRACT

An assembly for adjusting the attitude of any selected portion a structure such as a motor vehicle. A controller connects to and controls one or more jacks operable to change the attitude of a structure. A proportional tilt sensor is connected to the controller and is supported on the structure. The tilt sensor provides signals to the controller, which represent the degree of longitudinal pitch and lateral roll of a portion of the structure the sensor is connected to. The controller moves a selected portion of the structure into a desired attitude by commanding movement of the entire structure into an attitude where the tilt sensor signals match any one of a number of preset reference values corresponding to the desired attitude of the selected portion of the structure.

20 Claims, 26 Drawing Sheets

VEHICLE ATTITUDE ADJUSTMENT ASSEMBLY

This patent application is a continuation in part of U.S. patent application Ser. No. 09/528,614, filed Mar. 20, 2000, now U.S. Pat. No. 6,584,385, which claims the benefit of provisional application U.S. Ser. No. 60/157,310 filed Oct. 1, 1999.

TECHNICAL FIELD OF THE INVENTION

This invention relates generally to a motor vehicle leveling assembly, and, more particularly, to such an assembly that analyzes the attitude of a motor vehicle in two axes and uses leveling devices to correct or adjust the vehicle attitude to a relative reference attitude.

INVENTION BACKGROUND

The prior art includes automatic motor vehicle leveling systems, at least one of which requires only a single switch actuation to adjust to a level attitude an automotive vehicle such as a recreation vehicle (RV). Systems that level automatically generally include some type of controller that extends and contracts each of a plurality of levelers until at least a portion of the vehicle is level. In most systems there are four levelers or "jacks" typically mounted adjacent the four corners of a vehicle, respectively.

For example, U.S. Pat. No. 5,143,386 issued Sep. 1, 1992 to Uriarte, discloses a motor vehicle leveling assembly including an automatic leveling system that includes a controller that selectively extends and contracts four jacks located adjacent the four corners of a vehicle. The controller includes a proportional tilt sensor that provides output signals corresponding to the degree of tilt of separate axes extending between the jacks. The controller responds to the output signals by energizing the jacks to extend or contract independently at a rate proportional to the tilt along the respective axes. The controller can also energize at least two of the jacks to extend or contract simultaneously to increase the speed of leveling. The Uriarte assembly levels a vehicle by first sensing the degree of vehicle tilt along a pair of diagonal axes that are disposed parallel to lines that extend through diagonally opposite jacks. At least two jacks are then simultaneously and independently expanded in response to outputs from sensors at the lowest corners of the vehicle. The controller expands the jacks at a rate proportional to the degree of tilt in their respective axes as indicated by the output of the tilt sensor.

However, a leveling system constructed according to the Uriarte patent is unable to tailor jack extension rates to respond to vehicle dynamics, cannot measure jack extension without relying on inputs from sensors located in the jacks, and cannot determine vehicle attitude change speed without measuring individual jack extension and contraction. The Uriarte system is also not designed to control tilt rate by changing jack drive rates dynamically and cannot change the jack drive rates based upon inputs other than tilt angle. The Uriarte leveler also cannot automatically select between alternative jack grounding procedures based on vehicle conditions (initial attitude of vehicle) and cannot determine jack ground contact without discrete pressure sensors. Uriarte also did not contemplate automatic selection between alternative leveling algorithms based on vehicle and ground conditions. Neither does the Uriarte system level in pairs parallel to longitudinal pitch and lateral roll (rather than diagonal) vehicle axes. The Uriarte system also lacks a means for maximizing signal stability based on rate of angular change and estimated signal noise. The Uriarte leveling system also does not allow an operator a choice between fully automatic and semi automatic leveling operations and includes no provision to automatically correct long term vehicle attitude changes that occur after initial leveling is complete. Still further, the Uriarte system is only able to accurately adjust the attitude of whatever portion of the vehicle is supporting the tilt sensor—and then only to gravity level.

What is needed is an improved motor vehicle leveling assembly that overcomes the shortcomings of prior art leveling systems.

SUMMARY OF THE INVENTION

An assembly is provided for adjusting the attitude of any selected portion a structure. The assembly comprises a controller and a proportional tilt sensor. The controller is configured to connect to and control one or more jacks operable to change the attitude of a structure. The tilt sensor is connected to the controller and is configured to be supported on the structure. The tilt sensor is also configured to provide signals to the controller that represent the degree of longitudinal pitch and lateral roll of a portion of the structure the sensor is connected to. The controller is configured to move any selected portion of the structure into a desired attitude by commanding movement of the entire structure into an attitude where the tilt sensor signals match any one of a number of different pre-set reference values corresponding to different desired attitudes of selected portions of the structure. This allows an operator to adjust the attitude of the structure to any one of a number of different predetermined attitudes.

According to another aspect of the invention, an assembly is provided for adjusting the attitude of any selected portion of a structure. The assembly comprises a controller, a proportional tilt sensor and a reference value selector. The controller is configured to connect to and control one or more jacks operable to change the attitude of a structure. The proportional tilt sensor is connected to the controller and is configured to be supported on the structure. The tilt sensor is further configured to provide signals to the controller, which represent the degree of longitudinal pitch and lateral roll of the portion of the structure the sensor is supported on. The controller is configured to move any selected portion of the structure into a desired attitude by commanding movement of the entire structure into an attitude where the tilt sensor signals match any one of a number of different pre-set reference values corresponding to different desired attitudes of selected portions of the structure. This allows any portion of the structure to be corrected to any desired attitude within a range of attitudes despite the location of the tilt sensor and allows the tilt sensor to be located anywhere in the structure. The reference value selector is connected to the controller and is configured to transmit operator inputs to the controller. The controller is configured to select between the pre-set reference values in response to inputs received from the reference value selector.

According to another aspect of the invention, a method is provided for calibrating an attitude correction assembly to recognize when a selected portion of a structure the assembly is installed on is in a desired attitude relative to gravity. The method includes providing a structure including jacks actuable to change the attitude of the structure; providing an attitude correction assembly on the structure, the assembly including a controller and a tilt sensor; actuating the jacks until the structure is in a first desired attitude; providing an input to the controller indicating that the current set of signals being received from the tilt sensor is a first set of signal values that will represent the first desired attitude for the controller to reference when selected in future attitude correction operations; actuating the jacks until the structure is in a second desired attitude relative to gravity; and providing an input to the controller indicating that the current set of signals being received from the tilt sensor is a second set of signal values that will represent the second desired attitude for the controller to reference when selected in future attitude correction operations.

BRIEF DRAWING DESCRIPTION

To better understand and appreciate the invention, refer to the following detailed description in connection with the accompanying drawings.

DETAILED DESCRIPTION OF INVENTION EMBODIMENT

Figure 1:
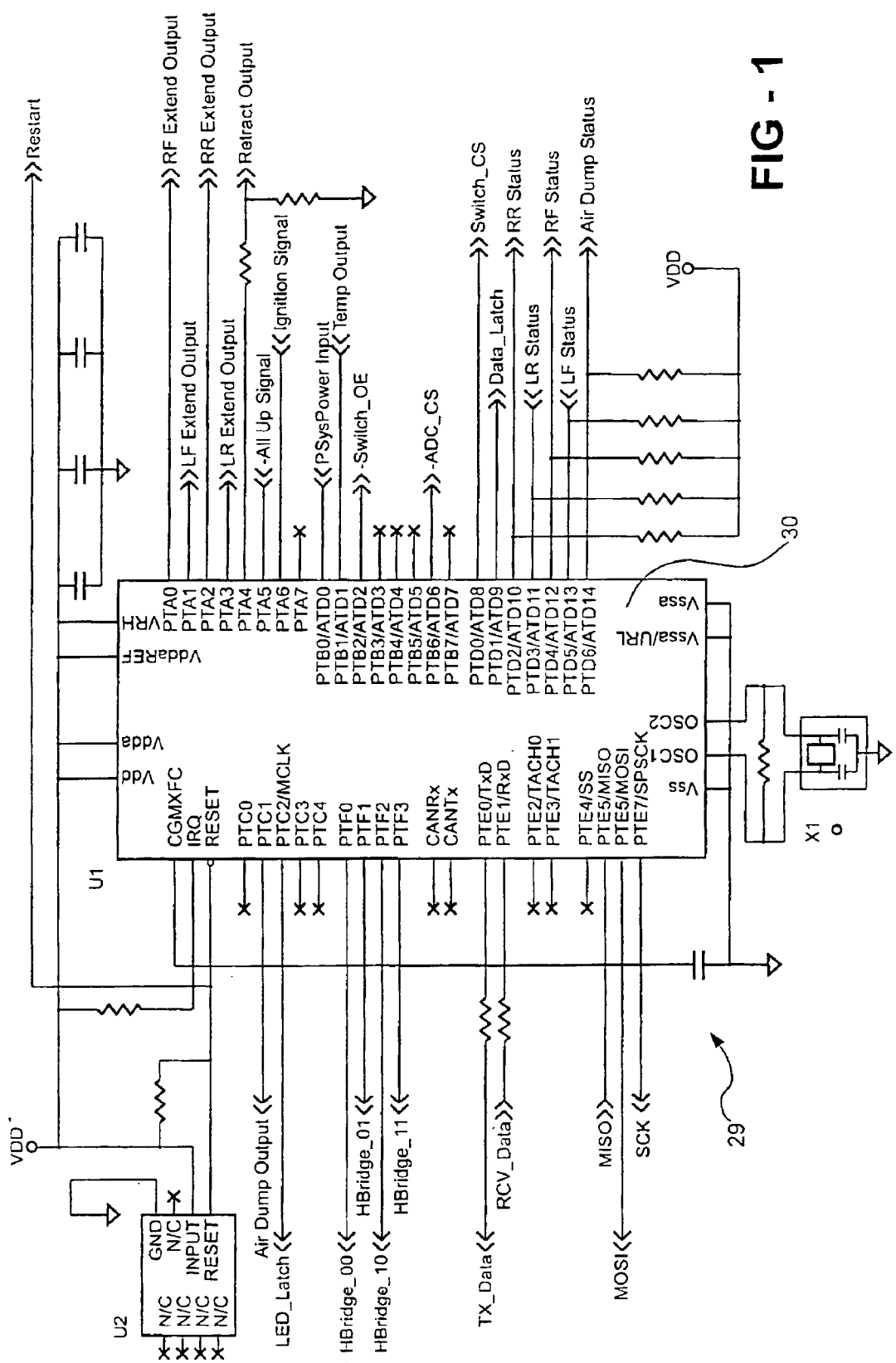
FIG. 1 is schematic pin-out diagram of an on-board microcontroller included in the controller of a leveling assembly constructed according to the invention.

A leveling assembly and method for analyzing the attitude of a platform or structure such as a motor vehicle in two axes and using levelers to correct the attitude of the structure relative to a calibrated reference point or attitude is shown in the drawings. While the embodiment described below and shown in the drawings discloses the use of the leveling assembly in a recreational vehicle application, it is readily adaptable to other leveling applications and may be installed on any suitable structure for the purpose of leveling that structure.

As shown in the drawings, the assembly includes a controller 30 and a proportional tilt sensor 32. The controller 30 connects to and controls one or more vehicle levelers or jacks operable to change the attitude of a structure. The tilt sensor 32 is connected to the controller 30 and is supported on the structure. The tilt sensor 32 provides signals to the controller 30 that represent the degree of longitudinal pitch and lateral roll of a portion of the structure the sensor 32 is connected to. The controller 30 moves any selected portion of the structure into a desired attitude by commanding movement of the entire structure into an attitude where the tilt sensor 32 signals match any one of a number of different pre-set reference values corresponding to different desired attitudes of selected portions of the structure.

A reference value selector 31 is connected to the controller 30 and is configured to transmit operator inputs to the controller 30. The controller 30 is configured to select between the pre-set reference values in response to inputs received from the reference value selector.

As shown in FIG. 1, the assembly includes a "pitch and roll control unit" (PRCU) 29 that includes the controller 30. The controller 30 included in the present embodiment is a Motorola MC68HC908AS60 microcontroller and the software architecture described below is designed to specifically reside with this microcontroller. However, in other embodiments, the architecture could easily be adapted to any equivalent microcontroller having 2048 bytes RAM, 60 kilobytes ROM, a synchronous serial communications port (SPI), an asynchronous serial communications port (SCI), a programmable timer output compare interrupt and an 8-bit Analog to Digital Converter (ADC) with at least 2 channels. All control and processing is done by the on board microcontroller 30. The microcontroller 30 is programmed with software that contains algorithms and control sequences for operating the leveling assembly in each of a number of different modes. The microcontroller 30 actuates all levelers, sensor interfaces, display devices, etc. of the assembly.

Figure 4:
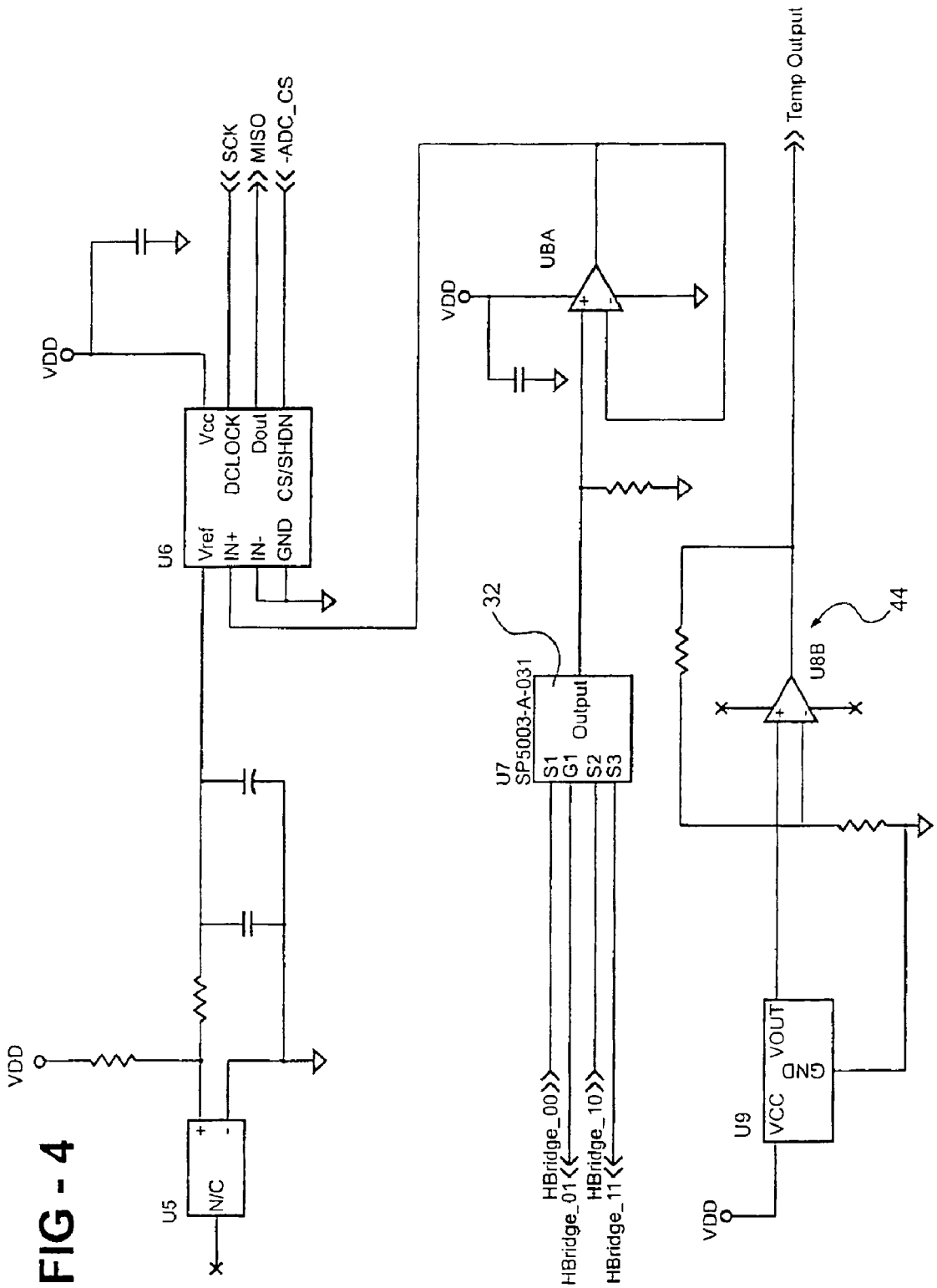
FIG. 4 is a schematic diagram showing a dual axis tilt sensor along with interface circuitry for providing data from the sensor to the microcontroller of FIG. 1 and a temperature compensation circuit.

The tilt sensor is a Spectron SP proportional two-axis tilt sensor and is shown schematically at 32 in FIG. 4. The controller 30 tailors jack extension rates to respond to vehicle dynamics and measures jack extension rates and vehicle attitude change speed using inputs from the tilt sensor 32. Unit sensitivity is calibrated at the factory for both axes according to the following equations:

X axis sensitivity=XX LSB/Degree where XX=the number of LSB's (# of bits) as derived in the linear range of the tilt sensor (0–8 degrees) in the x axis.

Y axis sensitivity=YY LSB/Degree where YY=the number of LSB's (# of bits) as derived in the linear range of the tilt sensor 32 in the y axis.

The sample rate of the tilt sensor 32 is done at each instant during run time. The controller 30 will limit the speed at which the jacks are extending such that the rate of jack extension will not exceed the equivalent of 1/10th of a degree in 40 ms averaged over any 100 ms period (moving window):

Filtered X or Y movement (LSB)/100 ms<0.25 degrees

The controller 30 also estimates the amount of resonant noise at the tilt sensor 32 after the hydraulics are stopped. The controller 30 will delay any successive jack actuation until a 2.5 second period where the average variance in the sensor reading is <=0.0625 degrees.

The controller 30 also changes jack drive rates dynamically to control the tilt rate based upon inputs other than tilt angle. As expressed by the following program step, if the amount of over or undershoot measured is beyond a specific threshold the drive rate will be decreased:

IF (Filtered X or Y axis reading at "Level Stop")−(Filtered X or Y reading prior to next jack actuation or end level) >Threshold . . . Decrease drive rate.

In the above step, "Level Stop" readings are part of the adaptive process that indicates whether further changes are necessary for the next level cycle, i.e., whether stop point accuracy can be further improved.

In all cases drive rate is controlled by the following formula:

Drive rate=100 ms on+PWM Rate*50 ms off

The PWM rate variable is controlled by the software.

As is described in greater detail below, the controller 30 automatically selects between two jack grounding procedures based on vehicle conditions, e.g., initial vehicle attitude, and is able to infer jack ground contact from changes in tilt angle without using inputs from discrete sensors.

The controller 30 levels a vehicle by extending the jacks in pairs parallel to longitudinal pitch and lateral roll vehicle axes. The controller 30 detects and corrects the worst axis first when commencing a leveling operation—the worst axis being the axis around which the greatest out-of-level condition exists.

Figure 10:
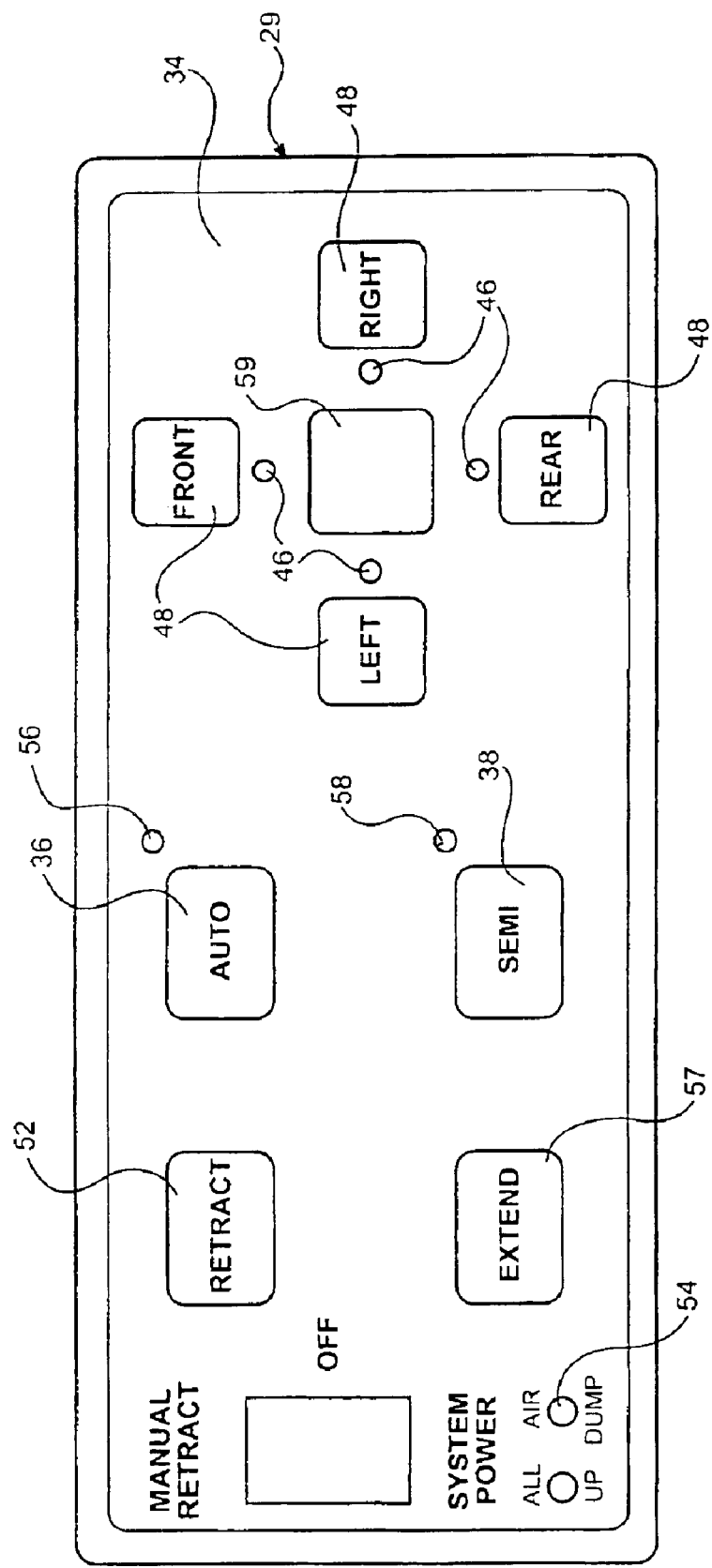
FIG. 10 is a schematic front view of two alternative leveler interface panel configurations.

The controller 30 also allows an operator to choose between fully automatic or semi-automatic leveling operations—both of which are described in detail below. The PRCU 29 of the leveling assembly includes an interface panel, shown at 34 in FIG. 10, that allows a user to select between an automatic and a semi automatic mode by pressing the AUTO switch 36 or the SEMI switch 38, respectively. The microcontroller 30 will select the correct leveling algorithm in response to switch actuation. In the automatic mode, the controller 30 automatically corrects long-term vehicle attitude changes that occur after leveling. The semi automatic mode differs only in that it requires that a user intervene to actuate the hydraulics through the interface panel.

The interface panel 34 also serves as the reference value selector 31. In an attitude correction operation, an operator uses pre-determined inputs to the interface panel 34 to instruct the controller which of a number of pre-set reference or zero values the controller should use as a reference in adjusting the attitude of the structure.

The controller 30 employs adaptive filtering to maximize signal stability based on rate of angular change and estimated signal noise. Unlike other systems that extract data from a dual axis tilt sensor 32, an assembly constructed according to the illustrated embodiment will, through adaptive filtering, automatically change controller response to sensor outputs depending on the mode and conditions the controller 30 sees. This allows the controller 30 to automatically manipulate sensor output in different ways to provide a desired result.

Figure 21:
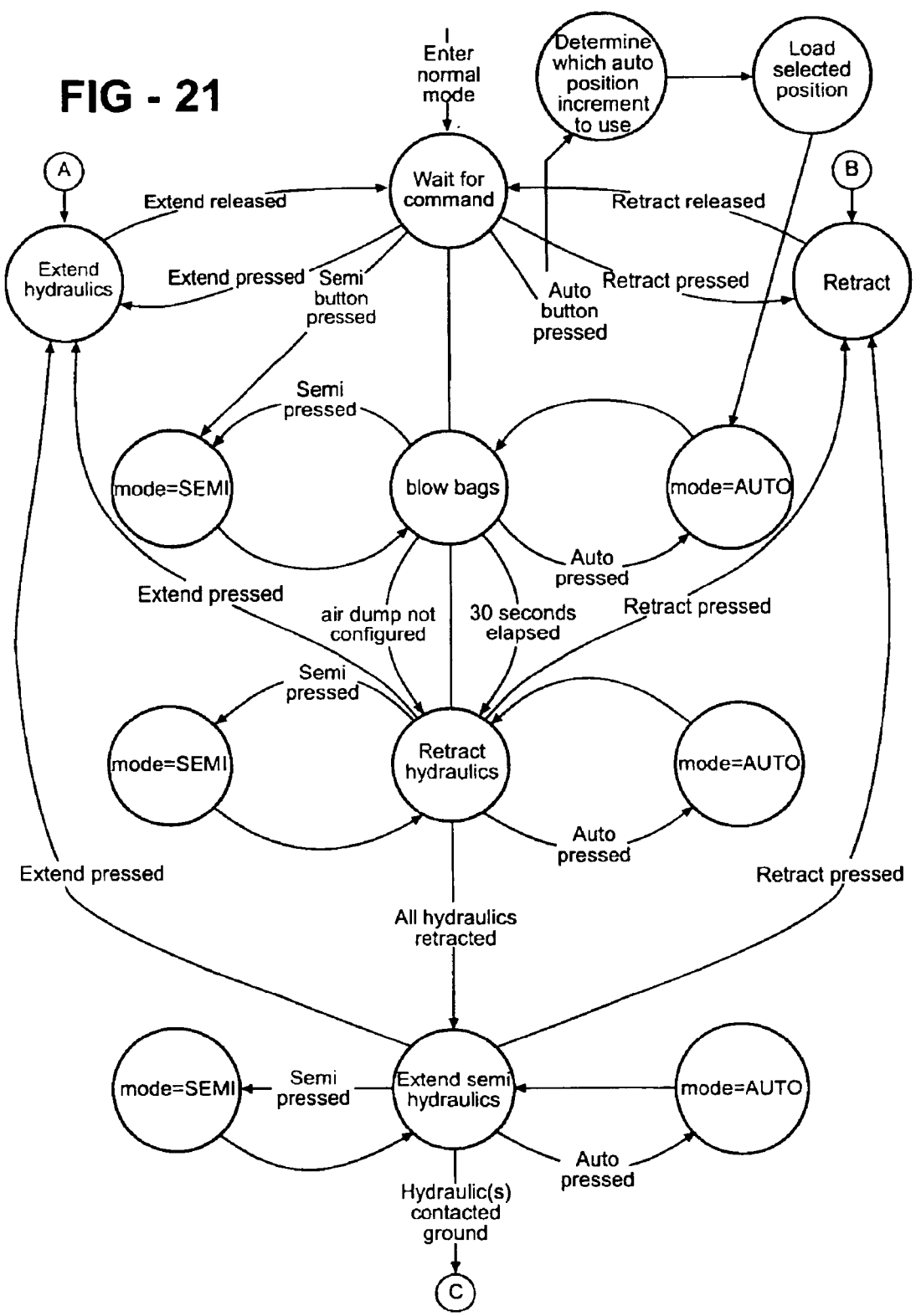
FIG. 21 is a state diagram showing a portion of the a leveler grounding sequence of the controller.
Figure 22:
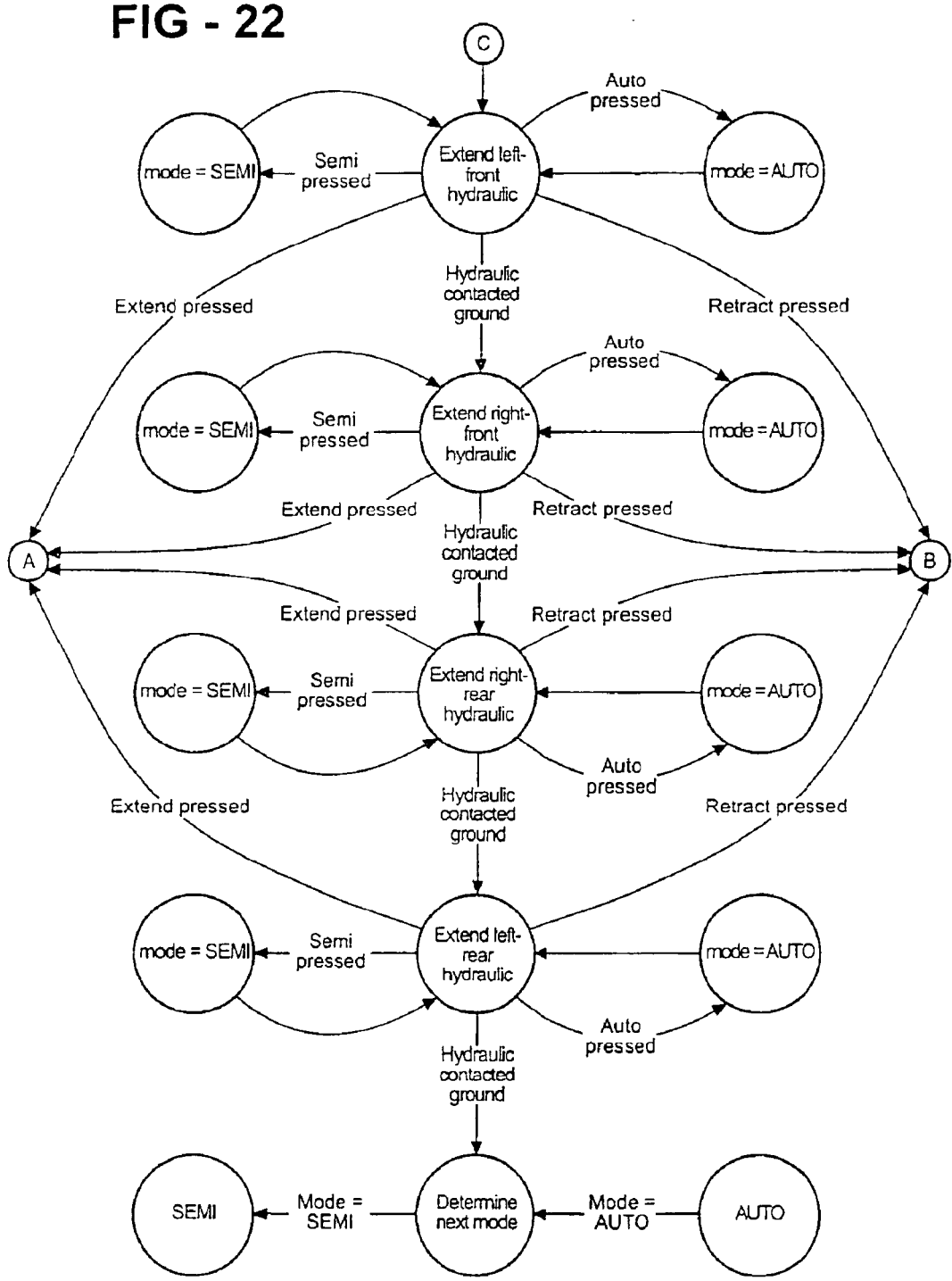
FIG. 22 is a state diagram showing the remainder of the leveler grounding sequence of FIG. 21.

Adaptive filtering is accomplished by the controller 30 programmed with a software filter algorithm that functions as and can be thought of as a basic low pass filter. The order of the filter and the pole location is changed depending on operational mode and noise. When the tilt sensor 32 is attempting to detect ground contact during initial grounding of the levelers as shown in FIGS. 21 and 22, the sensor 32 must be very sensitive to changes in movement. Therefore, it is important not to use up or "waste" the entire hydraulic stroke of one or more of the levelers while extending the levelers to contact the ground. In such a situation, the order is lowered and the frequency bandwidth is increased. However, when a leveling sequence is in progress and changes are occurring per the predefined rate, accuracy becomes paramount and the signal is more aggressively filtered.

When levelers are not being actuated (in an initialization mode) the continuous sensor reading is checked for the amount of noise that is present when there is no movement, i.e., "no movement" noise. If a lot of "no movement" noise is sensed, the initial filter value is increased accordingly.

Basic C programming code implementation for adaptive filtering is as follows:

**ResultX and ResultY are raw tilt sensor readings. FilteredResultX and FilteredResultY are filtered versions of the ResultX and ResultY readings obtained by sending the raw ResultX and ResultY sensor readings through the dynamic filter. The dynamic filter gives stable information at bandwidths optimized for controller performance.

// allow filter to cover a fraction of the distance to the new value

FilteredResultX−=FilteredResultX>>shift; **limits the amount the filter can cover for any one sample.

FilteredResultX+=ResultX>>shift; **updates new value. Shift is equal to Filterlevel. Filterlevel is the filter order parameter of the implemented digital filter as decided by the calling routine. Filterlevel determines frequency roll off and phase response.

// allow filter to cover a fraction of the distance to the new value

FilteredResultY−=FilteredResultY>>shift; **same as above, but for y axis readings.

FilteredResultY+=ResultY>>shift;

// calculate angle based on filtered results

LSBs=FilteredResultX;

LSBs−=GetXZero( );** gets value that the unit was zeroed to.

GetXZero( ) retrieves user-set reference value representing a level x axis.

LSBsPerDegree=GetLSBsPerDegreeX( )>>4; ** gets calibrated value for sensitivity and normalizes. LSBsPerDegreeX( ) retrieves factory-calibrated sensor sensitivity value in the x axis.

result=LSBs/LSBsPerDegree; **calculates angle in $\frac{1}{16}$th degree increments.

if (result<=-127)
  Xangle=-127; ** limits range of results; Xangle is the result of converting FilteredResultX to degrees from the zero point.
else if (result>127)
  Xangle=127;
else
  Xangle=result;
LSBs=FilteredResultY; ** same as for X.
LSBs-=GetYZero( ); **GetYZero( ) retrieves user-set reference value representing a level y axis.
LSBsPerDegree=GetLSBsPerDegreeY( )>>4; ** LSBsPerDegreeY( ) retrieves factory-calibrated sensor sensitivity value in the y axis.
result=LSBs/LSBsPerDegree;
if (result<=-127)
  yangle=-127;
else if (result>127)
  yangle=127;
else
  Yangle=result; ** Yangle is the result of converting FilteredResultY into units of degrees from the zero point.
//increase order of filter
Loop(for val) **val equals order of filter
FilteredXAngle-=FilteredXAngle>>shift; **filters values again
FilteredXAngle+=Xangle<<(8-shift);
FilteredYAngle-=FilteredYAngle>>shift; **val times
FilteredYAngle+=Yangle<<(8-shift);

During initial extension of the levelers at the beginning of a leveling operation, to ensure a quick and robust leveling sequence, the controller 30 tops the levelers just after they contact and are firmly engaged with the ground. The adaptive filtering algorithm allows the controller 30 to recognize ground contact by looking at specific output characteristics received from the tilt sensor 32. The output characteristics that the algorithm looks at are noise, rate of change, scale factor and temperature.

Figure 23:
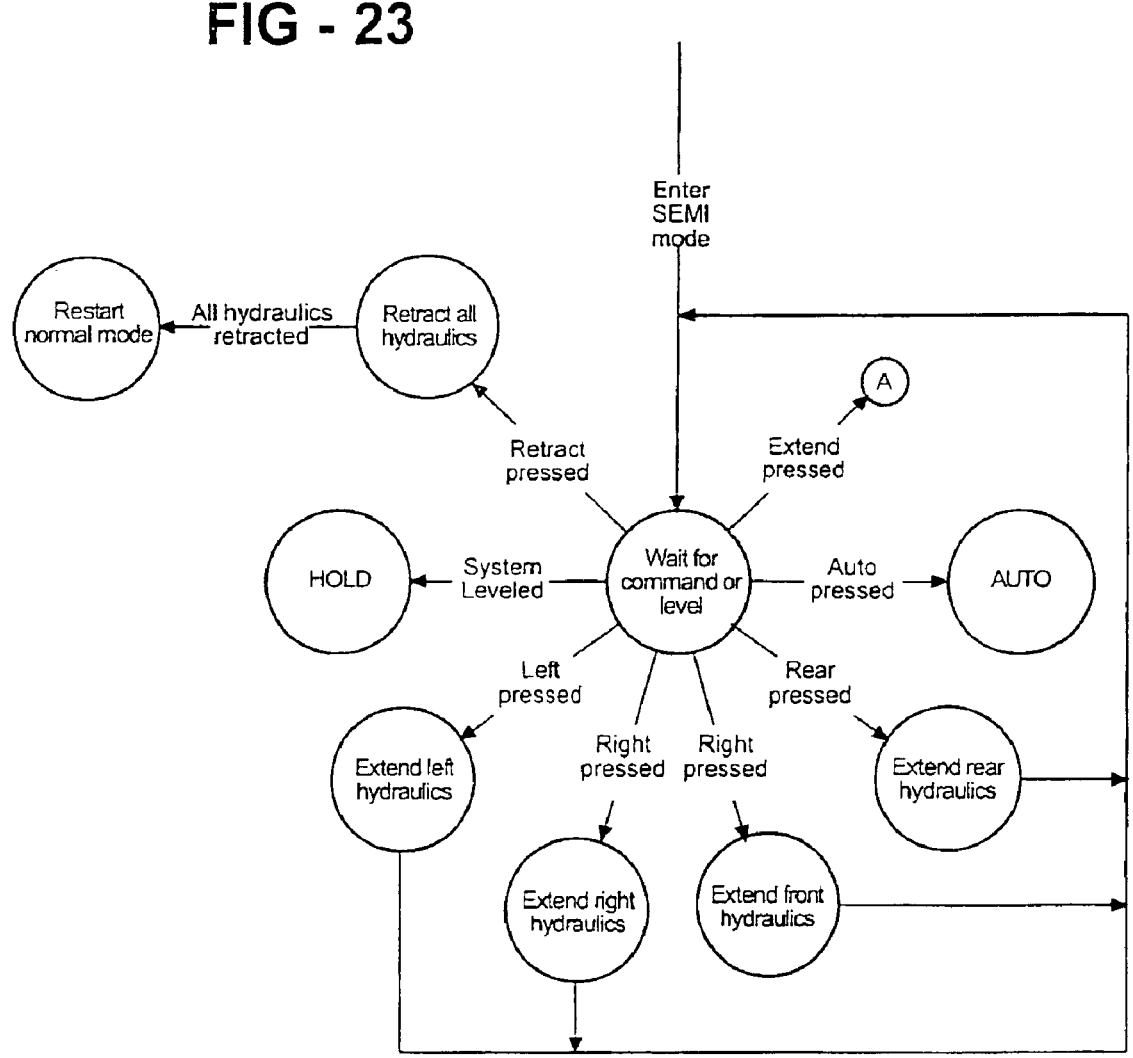
FIG. 23 is a state diagram showing a semi-automatic leveling sequence option of the normal mode.
Figure 24:
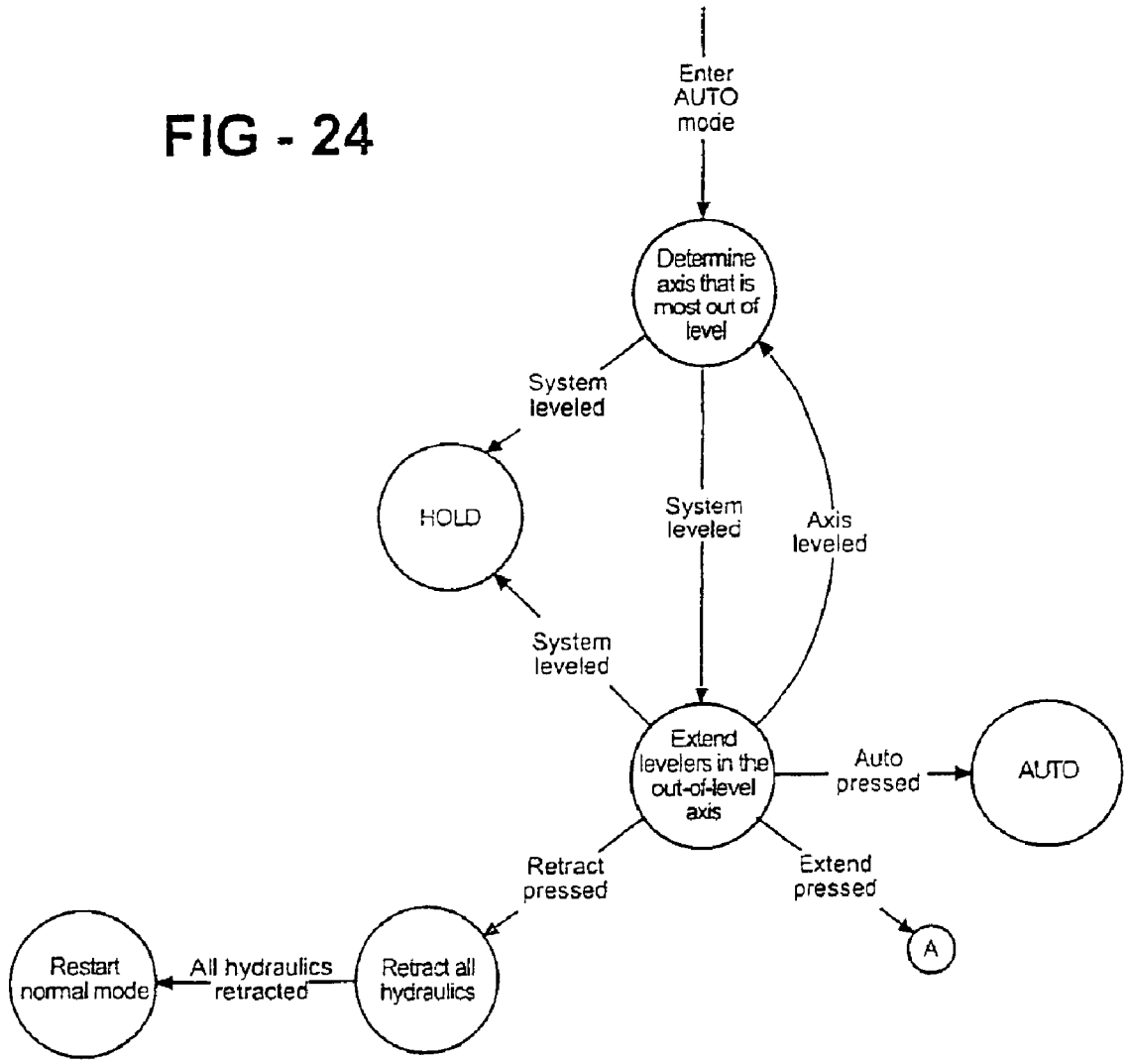
FIG. 24 is a state diagram showing an automatic leveling sequence option of the normal mode.

The adaptive filter algorithm allows an optimal extension sequence to take place and ensures the most reliable sensing of ground contact. It does this by actuating and extending two levelers at a time until the controller 30 senses that the levelers have contacted the ground. The controller 30 then actuates the remaining set of two levelers until the controller 30 senses that they have contacted the ground. In response to initial ground contact of all the levelers, the adaptive filter is adjusted and the controller 30 extends each individual leveler, one at a time, until all four levelers are firmly grounded as shown in FIGS. 23 and 24.

As is described above, the filter parameters are changed dynamically to allow a greater sensitivity and to limit excess leveler travel. The order and/or the filter frequency (sample rate and or shift #) is increased. The filter frequency formula is as follows:

Frequency=$\frac{1}{6.28}$*((2^shift-1)*sample rate)

Each software mode in the microcontroller 30 can selectively adjust the filter to obtain optimal performance in response, stability, noise immunity, etc. The formulas are always the same as those described above. Different variables hold different filtered results and different coefficients depending on modes (note that an individual mode will adjust the filter).

The tilt sensor 32 is connected to the controller 30 and may be mounted at any point on a vehicle to be leveled. The tilt sensor 32 is configured to provide analog signals to the controller 30 representing the degree of longitudinal pitch and lateral roll of a vehicle the sensor is connected to, and the controller 30 is configured to receive and use those signals to determine vehicle attitude relative to a calibrated sensitivity factor and a user-defined zero point. Therefore, a motor vehicle leveler constructed according to the invention allows a user or installer to determine which portion of the vehicle will be level relative to gravity despite the location of the tilt sensor 32. The tilt sensor 32 may, therefore, be located anywhere in the vehicle. The module that houses the tilt sensor 32 includes a "Front of Vehicle" label to allow an installer to properly orient the tilt sensor 32 in a vehicle.

Figure 19:
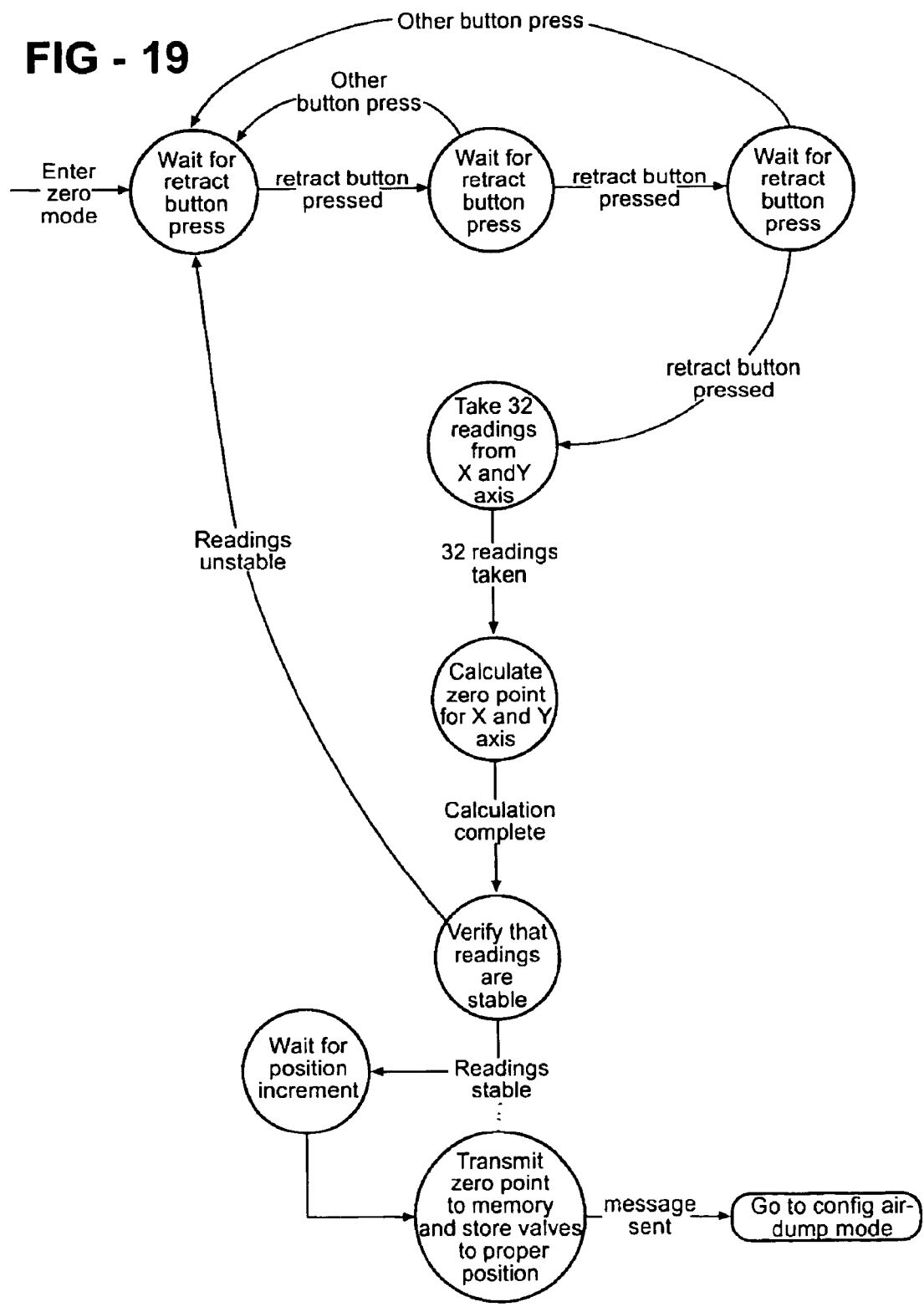
FIG. 19 is a state diagram showing a "zero" mode of the controller.

The tilt sensor 32 is used instead of limit type switches so that, instead of having the controller 30 wait for digital inputs that indicate a level state, the tilt sensor 32 continuously supplies analog values to the controller 30. The tilt sensor 32 continuously supplies analog values to allow the controller 30 to calculate a position relative to a calibrated sensitivity factor and a user defined zero point as shown in FIG. 19. Only one point needs to be calibrated to ensure proper operation. A unique software algorithm drives the sensor to achieve maximum stability and gain and to condition the sensor results to achieve a stable output.

The tilt sensor 32 is temperature-compensated to ensure maximum resolution and stability over a wide range of temperature conditions. This is accomplished by the circuit shown at 44 in FIG. 4.

The assembly is calibrated to recognize when a selected portion of a structure the assembly is installed on is in a desired attitude relative to gravity. This is done by first mounting the assembly on a structure that includes jacks actuable to change the attitude of the structure. The jacks are then actuated until the structure is in a first desired attitude. An input is then provided to the controller 30, which indicates that the current set of signals being received from the tilt sensor 32 is a first set of signal values known collectively as a first "relative zero value" that will represent the first desired attitude for the controller 30 to reference when selected in future attitude correction operations. The jacks may then be actuated once again until the structure is in a second desired attitude relative to gravity. An input is then provided to the controller 30 indicating that the current set of signals being received from the tilt sensor 32 is a second set of signal values, or, a second relative zero value, that will represent the second desired attitude for the controller 30 to reference when selected in future attitude correction operations. This process is repeated until a desired number of different attitudes or positions have been entered for future reference.

In normal operation, the system includes automatic and semiautomatic leveling modes. In both the automatic and the semiautomatic modes, the unit achieves and maintains a desired attitude via a unique optimized leveling algorithm that uses a preset relative zero value, a smart axis-to-level algorithm, and subsequent auto correction feature. As is more fully described below, one or more relative zero values are preset during unit installation. Each zero value is preset to allow an operator to achieve a different vehicle attitude or position. For example, one relative zero value may correspond to a vehicle attitude that elevates the head of a bed in the vehicle while another may position the vehicle such that a sink in the vehicle is level. Once an operator has selected one of these zero values the controller 30 uses the selected zero value as a reference value in a "smart zeroing" process that will achieve the desired vehicle attitude. In presetting each of the relative zero values, an operator or installer determines what tilt sensor 32 attitude the controller 30 will recognize as being a "zero (level) state" corresponding to a desired vehicle attitude. When an operator later selects one of the preset relative zero values, that relative zero value is then passed to an algorithm that decides how to optimally level the vehicle, i.e., to achieve the zero state each time the vehicle is subsequently leveled. The controller 30 determines an optimum axis sequence that will achieve the selected zero state with the least overshoot and leveler extension, then executes that sequence. The controller 30 executes that sequence to level the vehicle either automatically or semiautomatically. In the automatic mode, the controller operates the proper levelers according to the optimum sequence. In the semiautomatic mode, the controller indicates to an operator the proper sequence in which to manually actuate the levers, according to the optimum axis sequence.

The system continuously monitors the attitude of the vehicle after each leveling operation and continues to adjust the levelers as necessary to prevent the vehicle from being tipped out-of-level by such factors as vehicle settling, ground shift etc. The controller 30 continuously monitors analog values received from the tilt sensor and, relative to the preset zero state, adjusts the adaptive filter algorithm, and automatically adjusts the vehicle attitude after the vehicle has remained in an out-of-level attitude for longer than a predetermined minimum time period. As the vehicle approaches level and the controller 30 senses that the tilt sensor 32 is approaching the selected preset zero state, the filter order is decreased and the response increased so that phase delay is reduced. No individual leveler needs to be actuated during this sequence, only pairs of devices are activated at any one time.

In either fully automatic or semi-automatic mode, the controller 30 can also dynamically change the rate at which the levelers are actuated. This allows the controller 30 to optimize the leveler extension rate to suit any particular vehicle, surface condition, and/or output data characteristics of the sensor.

The fully automatic mode allows a user to initiate a leveling sequence without any further interaction. As shown in FIG. 24, the unit automatically takes care of all output extensions, and leveling sequences. In a first automatic mode, or, automatic mode 1 (using the first of two leveling algorithms), the controller 30 first determines whether the vehicle is in an initial attitude that is within an initial allowable range of attitudes from which the levelers will be able to level the vehicle (x and y axes must be <=+−3.0 degrees from zero point). The initial condition is user programmable and can be set to accommodate any manufacturer's levelers. Based upon the allowable travel of the leveler, one can calculate the maximum amount of adjustment possible (in degrees) and program the unit accordingly. The Air Dump mode is then activated if the controller 30 was initially configured to do so while in the air dump configuration mode during installation. (As is described more fully below, an installer will typically configure the controller 30 for entering the air dump mode before each leveling sequence whenever the vehicle is equipped with suspension air bags that must be deflated before leveling.) The controller 30 then retracts all the levelers and extends the front levelers until they contact the ground (The controller 30 senses ground contact when it receives signals from the tilt sensor 32 indicating a change in tilt angle of >=0.125 deg and <=0.250 deg). Each individual leveler is then extended in the order (LF, RF, RR, LR) until each leveler contacts the ground (Again, the controller 30 senses ground contact when it receives signals from the tilt sensor 32 indicating a change in tilt angle of >=0.125 deg and <=0.250 deg). The controller 30 then determines which axes need to be leveled (An LED display, shown at 46 in FIG. 10, indicates which axes are to be leveled by blinking the LEDs representing the axes to be leveled). The controller 30 then activates the appropriate levelers in a predetermined leveling sequence to adjust vehicle attitude until the vehicle is level. The proper outputs will be actuated as long as the user depresses the proper switch, i.e., the AUTO switch shown at 36 in FIG. 10. The software will also enable the controller 30 to detect when both axes have been leveled within tolerance (+−0.25 degrees from zero point).

The attitude of a structure such as a motor vehicle may be automatically maintained in a level attitude after initial leveling by leaving the assembly in the automatic mode following a leveling operation. Left in the automatic mode after leveling, the controller 30 will continue to monitor signals from the tilt sensor 32 and will automatically actuate appropriate levelers to level the vehicle whenever vehicle attitude changes by greater than a predetermined amount for longer than a predetermined period of time. (More specifically, the attitude change must remain for greater than 15 minutes. This is because the controller 30 includes a 5+−0.2 minute filter for each level state implemented before the controller 30 will command a correction.) In other words, after a vehicle has been automatically leveled, it takes fifteen minutes of continuous readings before the controller 30 will induce a change or correction. This feature prevents the controller 30 from entering a correction sequence based on transitory events such as vehicle sway cause by wind or occupant movement, etc. The step of extending each individual leveler is repeated for any other axis that requires leveling until the vehicle has been leveled in all axes.

In step form, automatic mode 1 is executed as follows:
1) Determine if vehicle is within initial allowable range to level (x and y axis must be <=+−3.0 degrees from whichever zero point has been selected)
2) Activate Air Dump if configured
3) Retract levelers
4) Extend front levelers until ground contact is established (PRCU detects a change in tilt angle of >=0.125 deg, <=0.250 deg)
5) Extend each individual leveler in the order (LF, RF, RR, LR) extending each leveler until ground contact is established (PRCU detects a change in tilt angle of >=0.125 deg, <=0.250 deg).
6) Determine which axes need to be leveled. Indicate via an LED 46 all axes to be leveled. The LED 46 corresponding to the axis to be leveled first will be blinking. The unit will automatically activate the proper axis, thus preventing an incorrect leveling sequence. The software will also detect when both axes have been leveled within tolerance (+−0.25 degrees from zero point). The unit will automatically correct for any shift in vehicle position for as long as the module is left in Automatic Mode. There is a 5+−0.2 minute filter for each level state implemented before correction is asserted. That is, after a vehicle has been leveled automatically, it takes fifteen minutes of continuous readings in order to induce a change/ correction. This feature eliminates the possibility of the controller 30 entering a correction sequence based on transitory events such as wind, occupant movement, etc. Repeat step 5 for any other axis until vehicle is leveled in all axes.

7) Continue to monitor and update level displays. Monitor inputs and actuate proper outputs.

The attitude of a motor vehicle may be semi-automatically leveled to a calibrated reference attitude by engaging the semi-automatic mode of the leveler. As shown in FIG. 23, in a first semi-automatic mode, semi-automatic mode 1 (using the first leveling algorithm), the controller 30 will first determine whether the vehicle is in an initial attitude that is within an initial allowable range of attitudes from which the levelers will be able to level the vehicle (x and y axes must be <=+−3.0 degrees from zero point). All the levelers are then retracted and the front levelers are extended until they contact the ground (The controller 30 senses ground contact when it receives signals from the tilt sensor 32 indicating a change in tilt angle of >=0.125 deg and <=0.250 deg). Each individual leveler is then extended in the order (LF, RF, RR, LR) until each leveler contacts the ground (Again, the controller 30 senses ground contact when it receives signals from the tilt sensor 32 indicating a change in tilt angle of >=0.125 deg and <=0.250 deg). The controller 30 then determines which axes need to be leveled and LED's 46 representing those axes are illuminated. It is also determined which axis of those that need to be leveled should be leveled first and the LED's 46 representing that axis are caused to blink. The levelers required to level the vehicle in that axis are then operated in response to an operator input (The controller 30 provides the proper outputs to the levelers as long as the user holds down the proper switch). An operator, having observed the blinking LED's, provides the necessary input by actuating a switch 48 corresponding to the blinking one of the LED's 46. In response to this switch actuation, the controller commands the corresponding levelers (the levelers required to level the vehicle in that axis) to extend. Switches corresponding to other levelers are disabled to prevent an operator from operating the wrong levelers. The controller 30 is also configured to detect when all axes have been leveled within tolerance (+−0.25 degrees from zero point) and will disable the input from the operator-actuated switch to prevent user overshoot. The above steps following and including the step of determining which axis should be leveled, are repeated until the vehicle has been leveled in all axes.

In step form, semiautomatic mode 1 is executed as follows:

1.) Determine if vehicle is within initial allowable range to level (x and y axes must be <=+−3.0 degrees from zero point)
2.) Retract levelers
3.) Extend front levelers until ground contact is established (PRCU detects a change in tilt angle of >=0.125 deg, <=0.250 deg)
4.) Extend each individual leveler in the order (LF, RF, RR, LR) extending each leveler until ground contact is established (PRCU detects a change in tilt angle of >=0.125 deg, <=0.250 deg)
5.) Determine which axes need to be leveled. Indicate via an LED all axes to be leveled. The axis to be leveled first will be blinking. The unit will not allow any input other than the blinking one, to be activated thus preventing an incorrect leveling sequence. The proper outputs will be actuated as long as the user holds down the proper switch. The software will also detect when the active axis has been leveled within tolerance (+−0.25 degrees +−hysteresis from zero point) and disable the switch input to prevent user overshoot.
6.) Repeat step 5 for any other axis until vehicle is leveled in all axis.
7.) Continue to monitor and update level displays. Monitor inputs and actuate proper outputs.
8.) There is a 5+−0.2 minute filter for each level state implemented before correction/update is allowed.

In a second automatic mode, automatic mode 2 (using the second leveling algorithm), the controller 30 will first determine if the vehicle is in an initial attitude that is within an initial allowable range of attitudes from which the levelers will be able to level the vehicle (x and y axes must be <=+−3.0 degrees from whichever zero point has been selected). Air dump is then activated if the controller 30 is so configured. All the levelers are then retracted. At this point, the controller 30 determines whether to execute the second algorithm (automatic mode 2) according to whether the vehicle is tilted in the y-axis (Front-Back, about the x-axis) such that it needs to be leveled beyond a defined threshold amount. If the vehicle is tilted beyond the threshold amount, the controller 30 executes the second algorithm. If not, the controller 30 executes the first algorithm, described above. The controller 30 executes the second algorithm by first commanding the levelers at the low end of the vehicle (front or the rear) to extend together until at least one makes ground contact (PRCU detects a change in tilt angle of >=0.125 deg, <=0.250 deg). The controller 30 then commands the low end levelers to extend individually in the order (L, R) until the other of the low end levelers has contacted the ground (PRCU detects a change in tilt angle of >=0.125 deg, <=0.250 deg). The controller 30 indicates which axis is to be leveled by commanding a corresponding LED to blink. The low end of vehicle is raised to level by extending the grounded low-end levelers. The controller 30 software detects when the selected axis has been leveled within tolerance (+−0.25 degrees from zero point). The remaining levelers are then grounded and any remaining out-of-level condition is detected and corrected. The process is repeated for any other axis that might require leveling until the vehicle is leveled in both axes.

As with automatic mode 1, after leveling, the controller 30 continues to monitor and update level displays, to monitor inputs and to actuate proper outputs according to the first algorithm. The unit will automatically correct for any shift in vehicle position as long as the controller is left in the automatic mode. There is a 5+−0.2 minute filter for each level state implemented before correction is asserted. That is, after a vehicle has been leveled automatically, it takes fifteen minutes of continuous readings in order to induce a change/correction. This feature eliminates the possibility of the controller 30 entering a correction sequence based on transitory events such as wind, occupant movement, etc.

In step form, automatic mode 2 is executed as follows:

1) Determine if vehicle is within initial allowable range to level (x and y axes must be <=+−3.0 degrees from whichever zero point has been selected)
2) Activate Air Dump if configured
3) Retract levelers
4) Determine if the vehicle needs to be leveled in the y-axis (Front-Back) beyond a defined threshold. If so, go to step 5
5) Extend low end (front or back) levelers (as determined in 4) together until ground contact is established (PRCU detects a change in tilt angle of >=0.125 deg, <=0.250 deg)

6) Extend each low end leveler individually (in the order LF, RF or LR, RR) until both have contacted the ground (PRCU detects a change in tilt angle of >=0.125 deg, <=0.250 deg)
7) Level the low end (front or back) of the vehicle. Indicate via an LED 46 which axes need to be leveled. The axis to be leveled first will be blinking. The unit will automatically activate the proper axis, thus preventing an incorrect leveling sequence. The software will also detect when both axes have been leveled within tolerance (+−0.25 degrees from zero point).
8) Ground remaining axis hydraulics.
9) Detect level condition in both axes and level per algorithm 1. The unit will automatically correct for any shift in vehicle position as long as the module is left in Automatic Mode. There is a 5+−0.2 minute filter for each level state implemented before correction is asserted. In other words, after a vehicle has been leveled automatically, it takes fifteen minutes of continuous readings in order to induce a change/correction. This feature eliminates the possibility of the controller 30 entering a correction sequence based on transitory events such as wind, occupant movement, etc. Repeat step 5 for any other axis until vehicle is leveled in all axes.
10) Continue to monitor and update level displays. Monitor inputs and actuate proper outputs.

Semiautomatic mode 2 (using the second leveling algorithm) is the same as automatic mode 2 except that the user must depress the corresponding blinking LED 46 at the appropriate time to level each active axis.

In either the automatic or the semi automatic mode, the controller 30 automatically selects between the two alternative leveling algorithms described above based on vehicle conditions, e.g., initial vehicle attitude. When the vehicle is tilted significantly in the fore-aft direction (about the x axis), the controller 30 selects the second algorithm to reduce the amount of leveler stroke/extension used up during the leveling process. The "long" axis (y axis) is leveled first (about the x axis) because vehicles are generally longer than they are wide and front and back levelers are generally spaced longitudinally from the road wheels. As a result, the extension of levelers at the low end of the vehicle causes vehicle to rotate about the roadwheels adjacent the high end of the vehicle and causes the overhanging high end of the vehicle to lower. Because they are starting from a lower position, the levelers at the high end of the vehicle need not extend as far to reach the ground than they would had they been lowered before or at the same time as the levelers at the low end of the vehicle.

Figure 18:
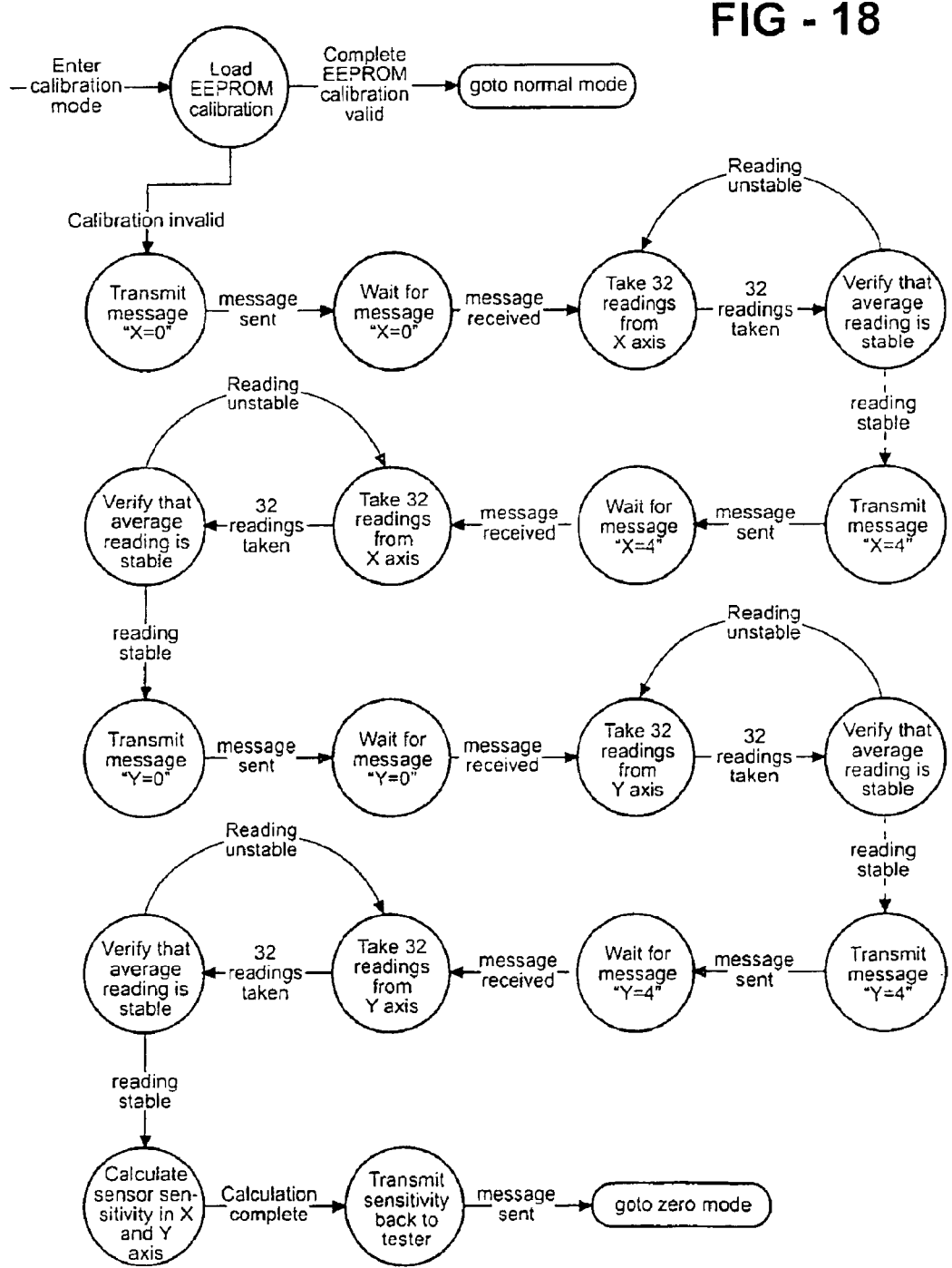
FIG. 18 is a state diagram showing a controller calibration mode.

Along with the zeroing mode described generally above, the leveling assembly also includes a calibration mode, a "configure air dump" mode and a diagnostic mode. As shown in FIG. 18, the calibration mode allows the assembly to be calibrated to recognize when a vehicle it is installed on is level relative to gravity. This is done after installing the controller 30 or "main unit", the tilt sensor 32 and the interface panel unit 34 and all associated wiring in the vehicle. An installer then applies power to the controller 30 and confirms that the controller 30 is in an initial "zero mode".

In the zero mode, as shown in FIG. 19, the controller 30 is ready to receive a signal that will instruct it to recognize whatever analog signal values it is currently receiving from the tilt sensor 32 as representing a level or other desired vehicle attitude. In the Zero Mode, all of the LED's 46 disposed on the leveler interface panel 34 are on and flashing. A pair of temporary bubble levelers or another suitable type of attitude indicator may then installed at a desired location on the vehicle that is in line with both leveling axes. The individual levelers are then extended to establish ground contact. The installer or operator monitors the temporary level indicators while actuating pairs of the levelers in a predetermined order to achieve a desired vehicle attitude (the desired attitude need not be level but will be referred to as a "level" condition as that is the most likely scenario for most foreseeable applications). After 30 seconds have elapsed a retract switch on the interface panel unit is actuated 3 times to signal the controller 30 to set a "zero point", i.e., to establish for future recognition a set of tilt sensor signal values that the controller 30 will recognize as indicating a level condition or other desired attitude. After verifying that readings from the sensor are stable, the controller 30 waits a predetermined number of seconds for a position increment signal to be received indicating what position number or value the controller should assign that particular zero point. The position increment signal may be generated automatically, i.e., a new value for each successive zero value entered, or an operator may indicate what position increment value should be assigned through a predetermined series of keyboard entries, e.g., a single depression of the auto button for position 1, two successive depressions of the auto button for position 2, etc. In other embodiments, any suitable means of assigning values to different zero points may be used.

Once the controller 30 has received the position increment signal, it transmits the zero point values to be stored in memory in association with whatever position increment value was entered. If a tester is connected, the zero point values are also transmitted to the tester. The controller 30 then exits the zero mode.

If additional zero points are to be stored, the installer or operator causes the controller to re-enter the zero mode through a predetermined keyboard entry or series of entries. For example, the controller may be programmed to recognize 4 successive depressions of the "front" button followed by 4 successive depressions of the "back" button—all within the space of 10 seconds, as an instruction to enter the zero mode. Either before or after reentering the zero mode, the installer or operator actuates pairs of levelers in a predetermined order to achieve a second desired vehicle attitude. After 30 seconds have elapsed, the operator or installer actuates the retract switch on the interface panel 3 times to signal the controller 30 to set a second "zero point". After verifying that readings from the sensor are stable, the controller 30 waits a predetermined number of seconds for a position increment signal to be received indicating what position number or value the controller should assign the new zero point.

Once the controller 30 has received the position increment signal, it transmits the new zero point values back to the tester??? to be stored in memory in association with whatever position increment value was entered. The controller 30 then exits the zero mode.

An operator may also cause the controller 30 to reenter zero mode using a diagnostic tool that is connected to the controller 30 via an "RS232 interface". Once the controller has left the zero mode, all leveling is done relative to whichever of the preset zero values is selected.

It is therefore possible to optimize the level condition at any one location regardless of the attitude of the rest of the vehicle and the location of the tilt sensor 32. In addition, the leveling assembly is a two unit system that allows an installer to locate the sensing portion of the electronics, i.e., the tilt sensor 32, separate from the pitch and roll control unit 29 that, as stated above, includes the display interface 34 and the controller 30.

While in zero mode, this system will allow manual activation of the levelers to set the vehicle to any particular zero state. This activation does not interfere with the zero mode calibration procedure and is available to the user any time before commanding the system to set the active zero point.

Figure 17:
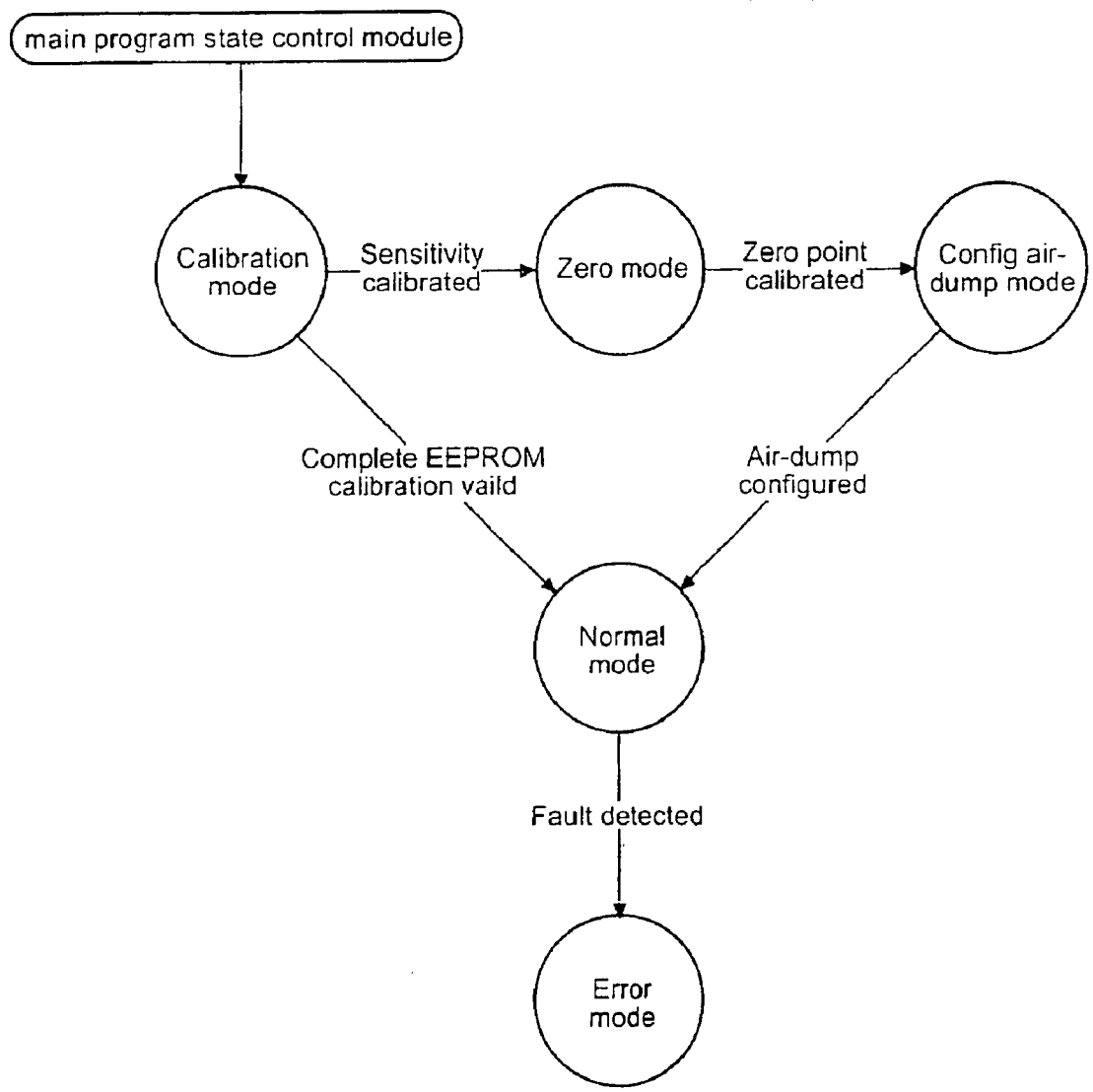
FIG. 17 is a state diagram showing a module that controls main program state.

Once the assembly has been calibrated to recognize when the vehicle in any one of a number of different preset attitudes, the controller 30 enters a "configure air dump" mode as shown in FIG. 17. The default for the unit is for the air dump mode NOT to be configured. An installer will have 20 seconds to configure the module for air dump by actuating a "retract" switch, shown at 52 in FIG. 10, three times in succession. If, at the end of the 20 seconds, the retract switch 52 on the interface panel has not been actuated 3 times, the module will be configured to NOT activate air dump. If the retract switch 52 has been actuated 3 times within 20 seconds of entering the configuration mode, the controller 30 will be configured to enter air dump mode for 30.0+−0.5 seconds prior to leveler extension. Whenever air dump is active, a corresponding LED shown at 54 in FIG. 10 illuminates on the interface panel.

This leveling assembly includes self-diagnostics and will prevent the assembly from operating if unit integrity cannot be guaranteed. Diagnostics are stored in on-board non-volatile memory in the controller 30.

The assembly also contains a PC-compatible diagnostic interface that allows a PC to query the controller 30 for active and stored faults and to allow an authorized user to place the system in any operational mode and download all functional and operational parameters in real time. The assembly may also be put into a diagnostic mode when connected to an IDS diagnostic tool. In the diagnostic mode, certain functional parameters can be modified. This allows an operator to configure the unit on a per vehicle basis. Modifiable parameters include the off period of solenoid drivers, level algorithm hysteresis, shift of delta in the filtered reading and current reading, and the value of tilt angle that represents true movement of the vehicle used to establish ground contact of levelers.

Figure 6:
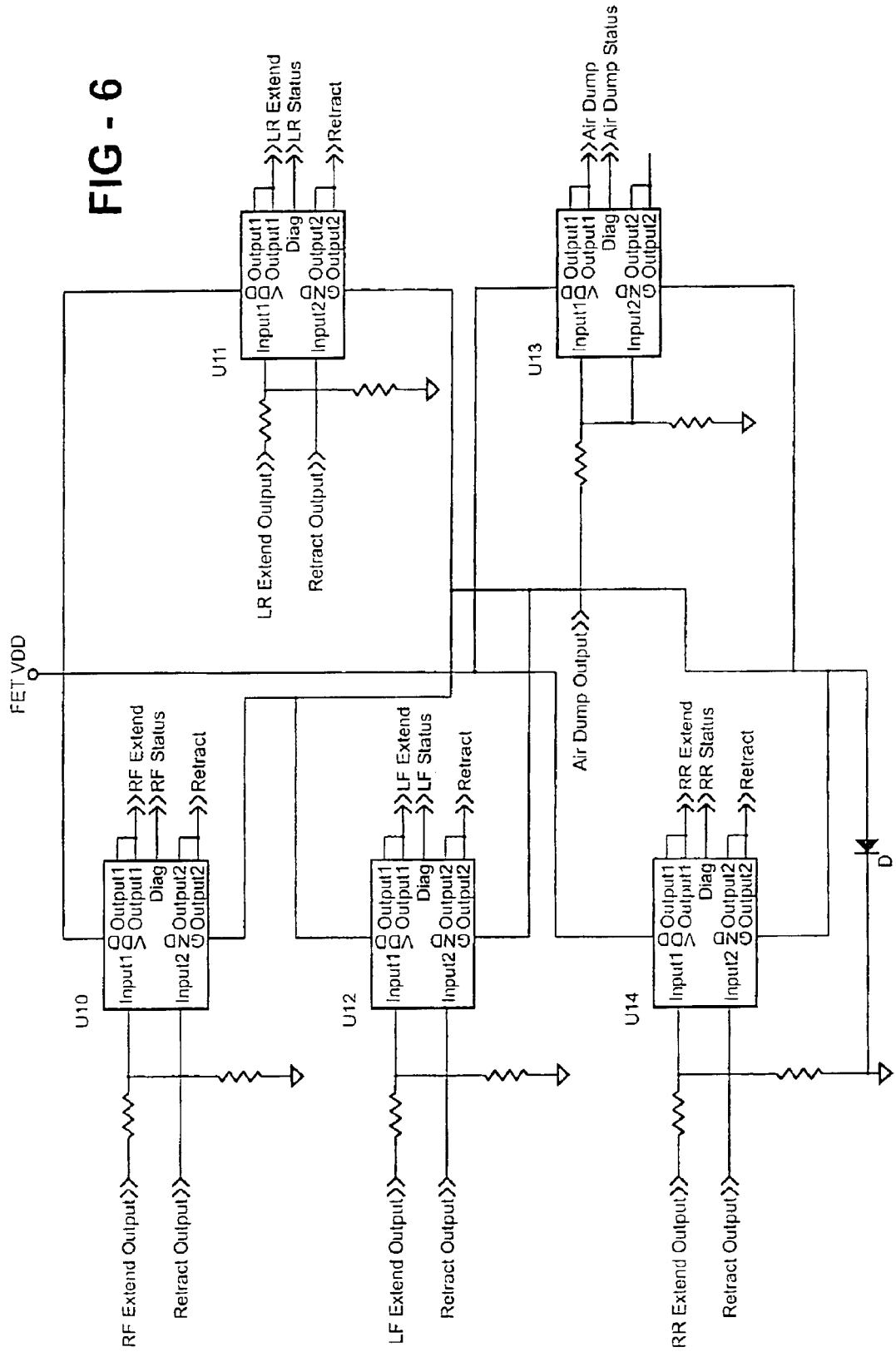
FIG. 6 is a schematic diagram showing drive circuitry for the vehicle levelers used on the leveling assembly.

As shown in FIG. 6, drive circuitry of the leveling assembly allows for any type of high side load to be driven. There are 10 general-purpose outputs available to switch high side voltage to any of a variety of devices. The system can be configured to drive these outputs in any manner and in any sequence. The outputs are totally scalable and can be configured to drive as many as 20 outputs. The outputs are fully diagnosable and have the ability to go into a "self-protect" mode automatically. These outputs can be dynamically programmed to drive any configured load. In the case of RVs, the air dump output is just such an example. On vehicles where this option is not necessary, the unit can be configured to ignore the output driver and all associated software flow related to this feature.

The leveling assembly includes features that make the entire leveling and driving process more "error free". For example, the controller 30 will automatically sense the state of the levelers and take action when a vehicle driver tries to move the vehicle without fully retracting the levelers. The controller 30 responds by activating an audible warning and by inhibiting further leveler operation until the vehicle ignition is turned off.

The leveling assembly may also include a light sensor for sensing the general lighting conditions. When a light sensor is included in the assembly, the controller 30 is programmed to automatically brighten the illuminated displays when ambient lighting conditions are high and to automatically darken the displays when ambient lighting is low.

Figure 2:
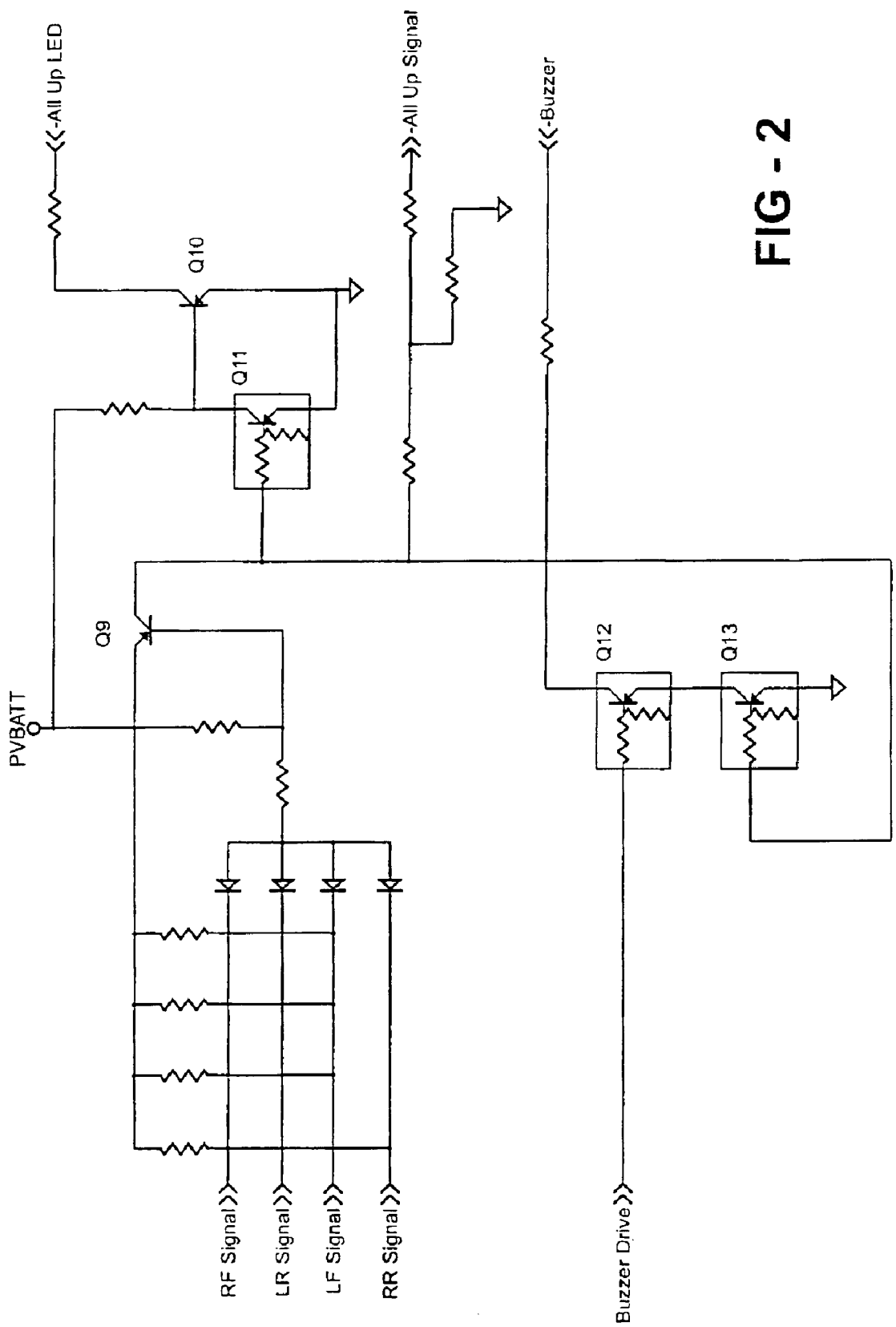
FIG. 2 is a schematic diagram showing circuitry that determines retracted states of vehicle levelers used in the leveler assembly, additional circuitry that detects vehicle conditions that prompt the controller to alert a driver of the vehicle, and an audio and visual alert output of the leveling assembly.

Circuitry for determining the retracted states of the levelers is shown in FIG. 2. Additional circuitry is present to detect vehicle conditions that should have a driver alert asserted. This can be any combination of the inputs listed on the schematic. All outputs are sent to the microcontroller 30 for additional manipulation and use in the control algorithms.

Figure 3:
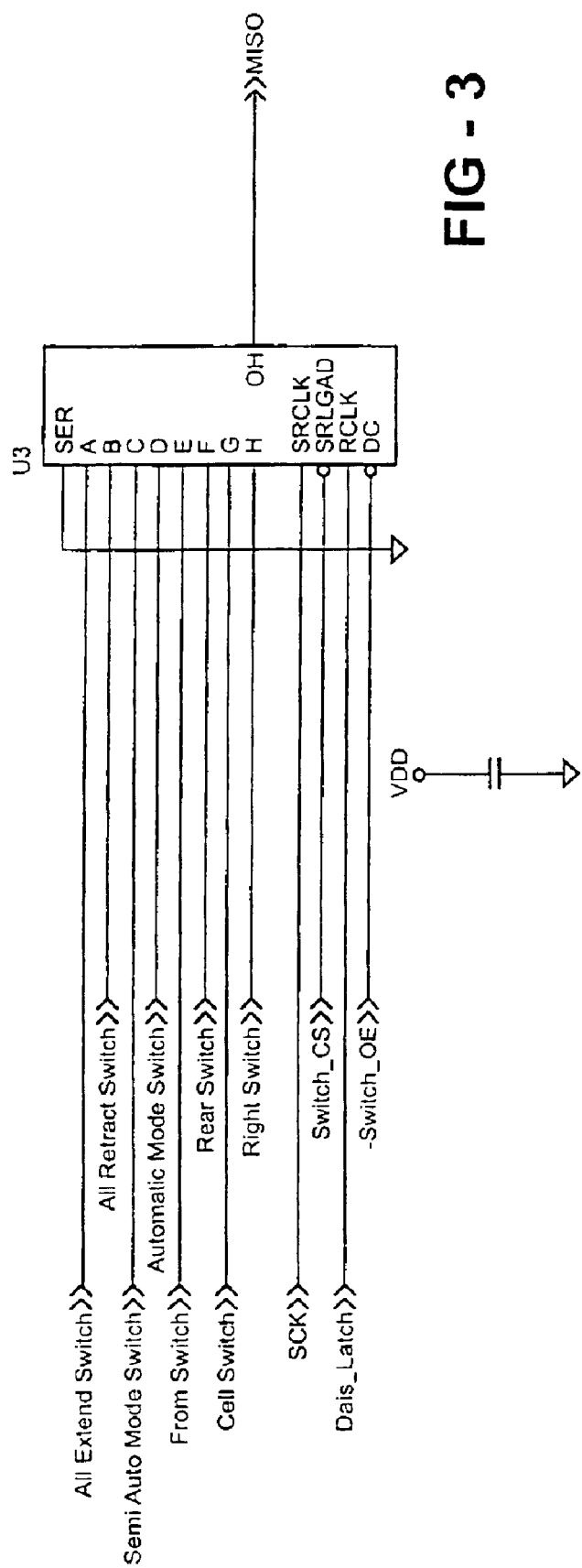
FIG. 3 is a schematic diagram showing circuitry that latches in various switch inputs for transfer to the microcontroller of FIG. 1.

The circuitry to present the switch inputs to the microcontroller 30 is shown in FIG. 3. Each input latch can accommodate up to 8 digital inputs. Latches can be daisy-chained so that the total number of inputs is scaleable up to 32 inputs. The microcontroller 30 input algorithm samples the inputs periodically and filters the raw inputs to provide the rest of the control algorithms meaningful information regarding the status of each input. Each input has a separate property in the software that allows independent configuration, filtering and sampling allowing a variety of digital devices to be connected seamlessly to the system.

Referring to FIG. 3, a low-to-high transition on "Data_Latch" will cause the external data to be loaded into the data latch. If "Switch_CS" is also low, the data will also be loaded into the shift register. When "Switch_CS" is low, the parallel data in the data latch is loaded into the shift register and serial shifting is inhibited. When "Switch_CS" is high, serial shifting is enabled.

Again referring to FIG. 3, in normal mode, "Switch_CS" is low, "Data_Latch" is low and "-Switch_OE" is high. For serial transfer, "Data_Latch" is driven high, "Data_Latch" is driven low, "Switch_CS" and "-Switch_OE" are driven low, serial transfer is conducted to get all 8 bits, then "Switch_CS" and "-Switch_OE" are driven high.

The dual axis tilt sensor 32 and the appropriate analog to digital converter hardware are shown in FIG. 4. The sensor is driven in a unique manner that allows enhanced sensitivity, response and noise immunity. Sensor sample rate is adjusted to allow optimal filtering response. The sample rate of the sensor effects the performance of the tilt sensor 32 as well, e.g., tilt sensor 32 start up time, stability, and drift. Initial values and limits are calibrated at production time and the adaptive algorithms use the values and limits to optimize performance. The software can vary sample rate, electrode on time and electrode off time.

The software dynamically-adjusts, as described above, to sample the sensor in the appropriate manner depending on which operating mode the system is in.

Figure 5:
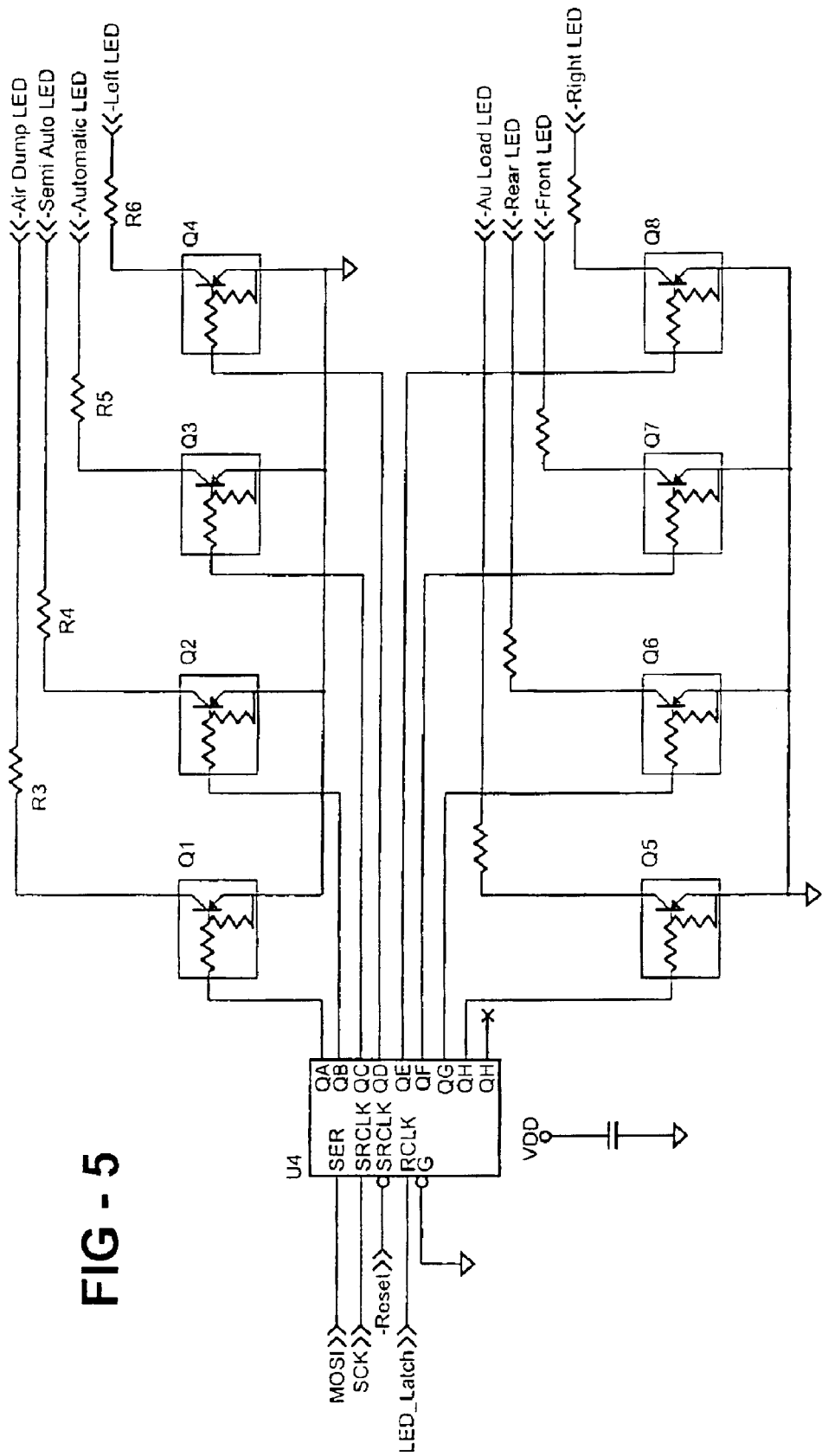
FIG. 5 is a schematic diagram showing circuitry that drives LED outputs of the controller and also showing additional circuitry that drives the LED outputs for the controller.

The circuitry used to drive the PC communication interface and the audio alert output is shown in FIG. 5. The communication protocol is developed especially for these types of embedded systems and allows the unit to communicate with a PC.

Referring to FIG. 5, on low-to-high transition of "LED_Latch", the contents of the shift register are transferred to the output latch. In normal mode, "LED_Latch" is low. For serial transfer, 8-bit serial transfer is conducted then "LED_Latch" is driven high, then "LED_Latch" is driven low.

Figure 9:
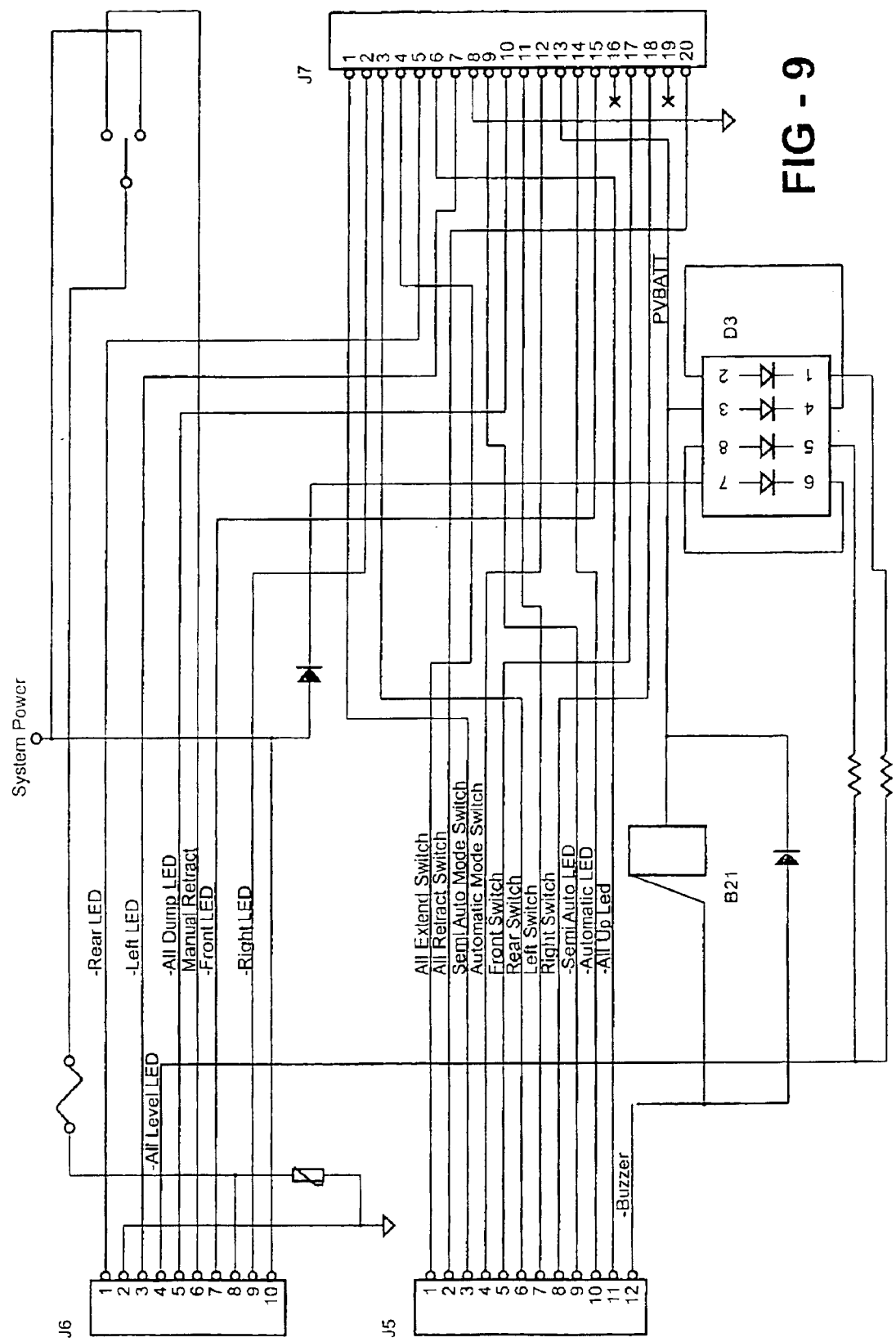
FIG. 9 is a schematic diagram of a circuit board of the display interface.

The circuitry necessary to drive the LED outputs is shown in FIGS. 6 and 9. This circuitry is also scaleable to accommodate up to 32 outputs. Standard outputs drive mode indicators 56, 58 and a level status annunciator 59. The mode indicators 56, 58, level status annunciator 59 and membrane switches 36, 38, 48, 52, 57 for operating the leveling assembly are supported on an interface panel shown in FIG. 10.

Figure 7:
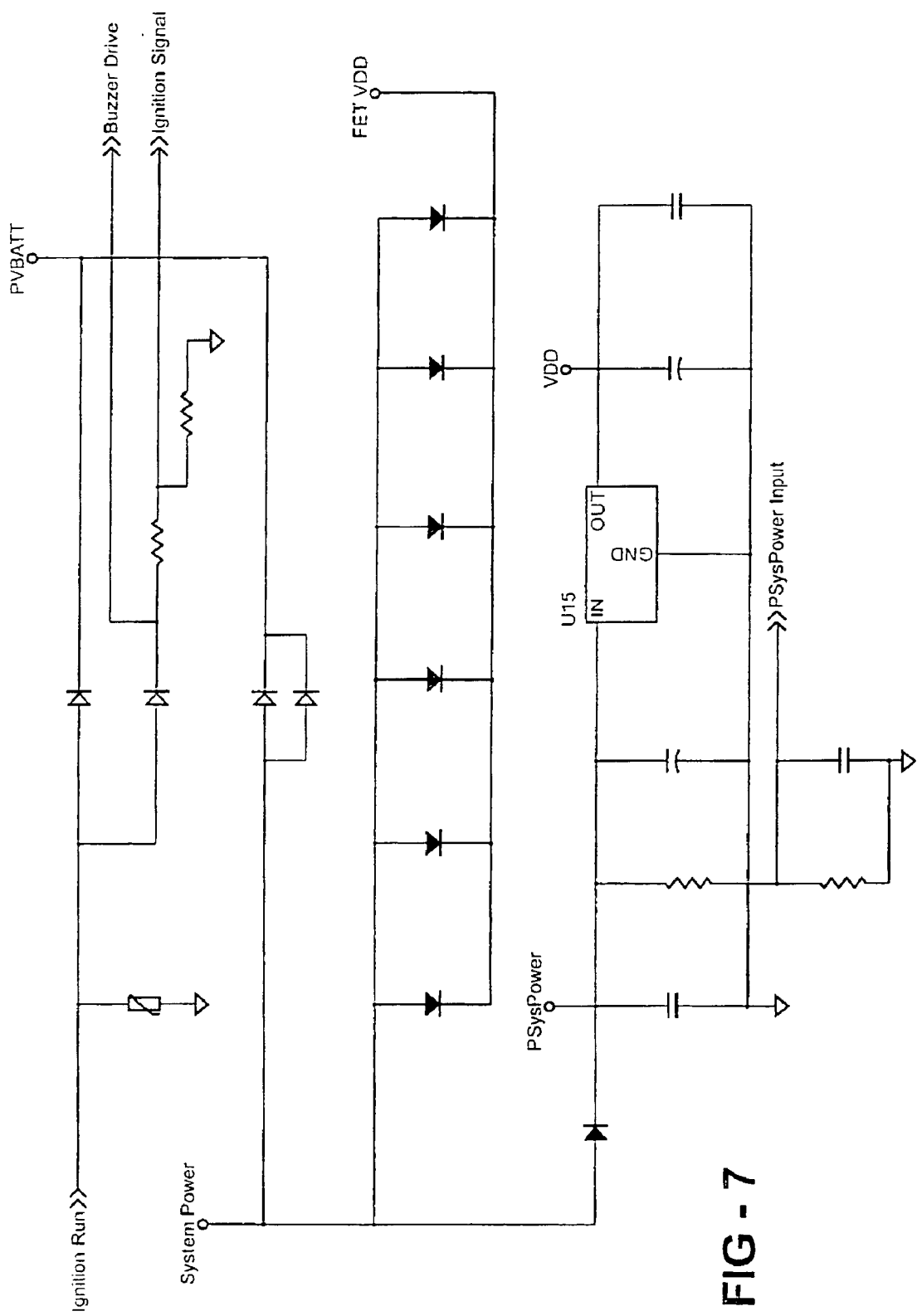
FIG. 7 is a schematic diagram showing circuitry that supplies regulated voltage to the microcontroller of FIG. 1 and power to the drive circuitry of FIG. 6.

The circuitry to drive the high side loads is shown in FIG. 7. Any load requiring high side drive can be used with this system as long as the current requirements do not exceed the component rating. The output drivers are controlled by software algorithm that determines optimum drive rate to ensure that a desired level of accuracy for the leveling process can be achieved. The outputs also feedback their diagnostic status to the microcontroller 30 which can use those inputs for fault detection and drive correction.

Figure 8A:
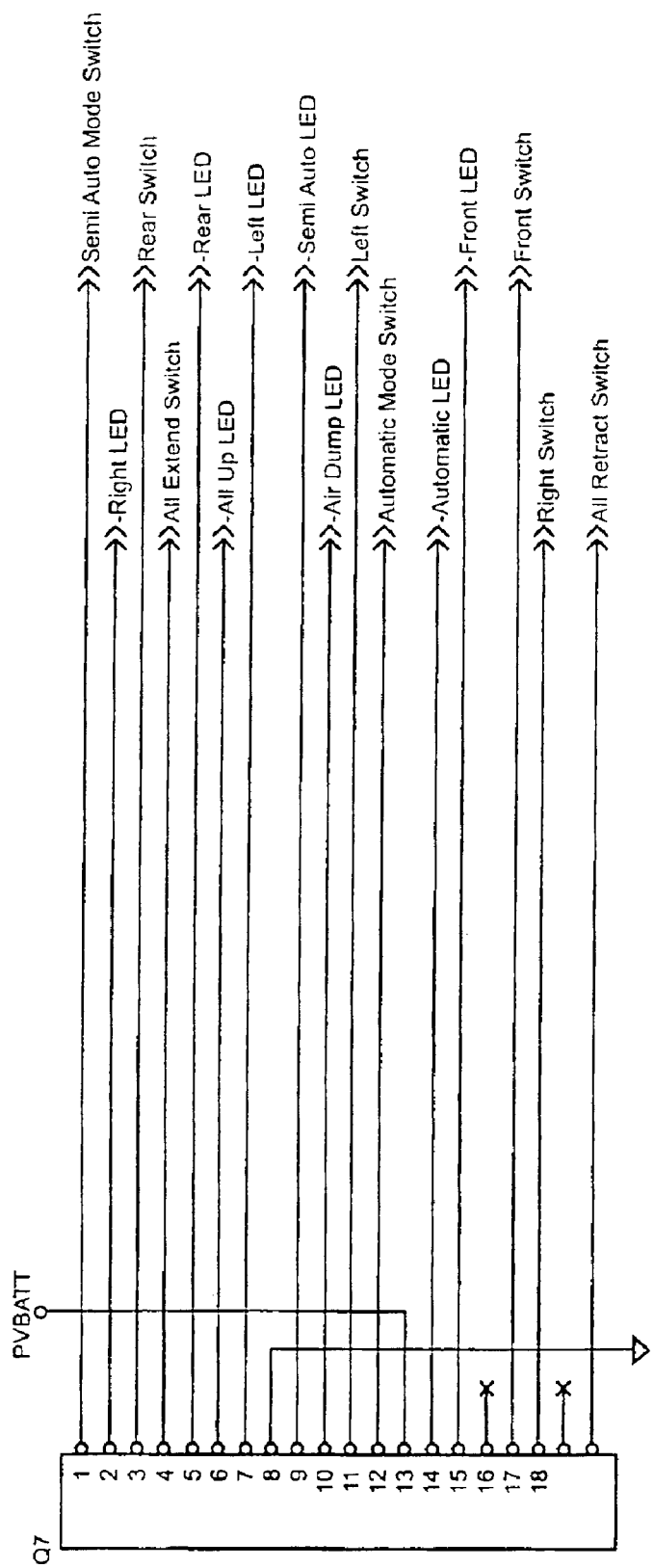
FIG. 8A is a schematic diagram showing the connector pin-out for a leveler interface of the invention.
Figure 8B:
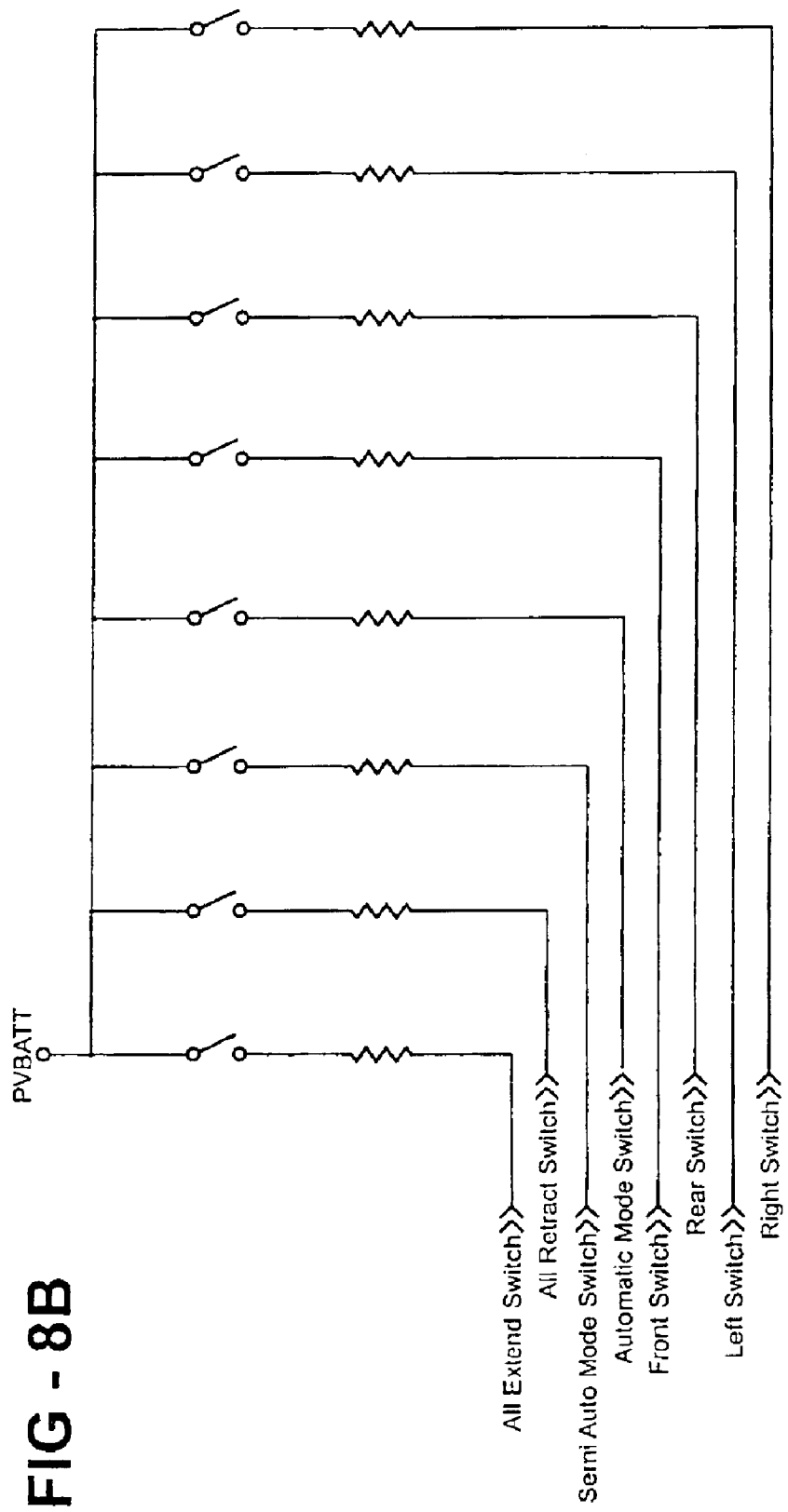
FIG. 8B is a schematic diagram showing circuitry for switches supported on a leveler interface panel of the invention.
Figure 8C:
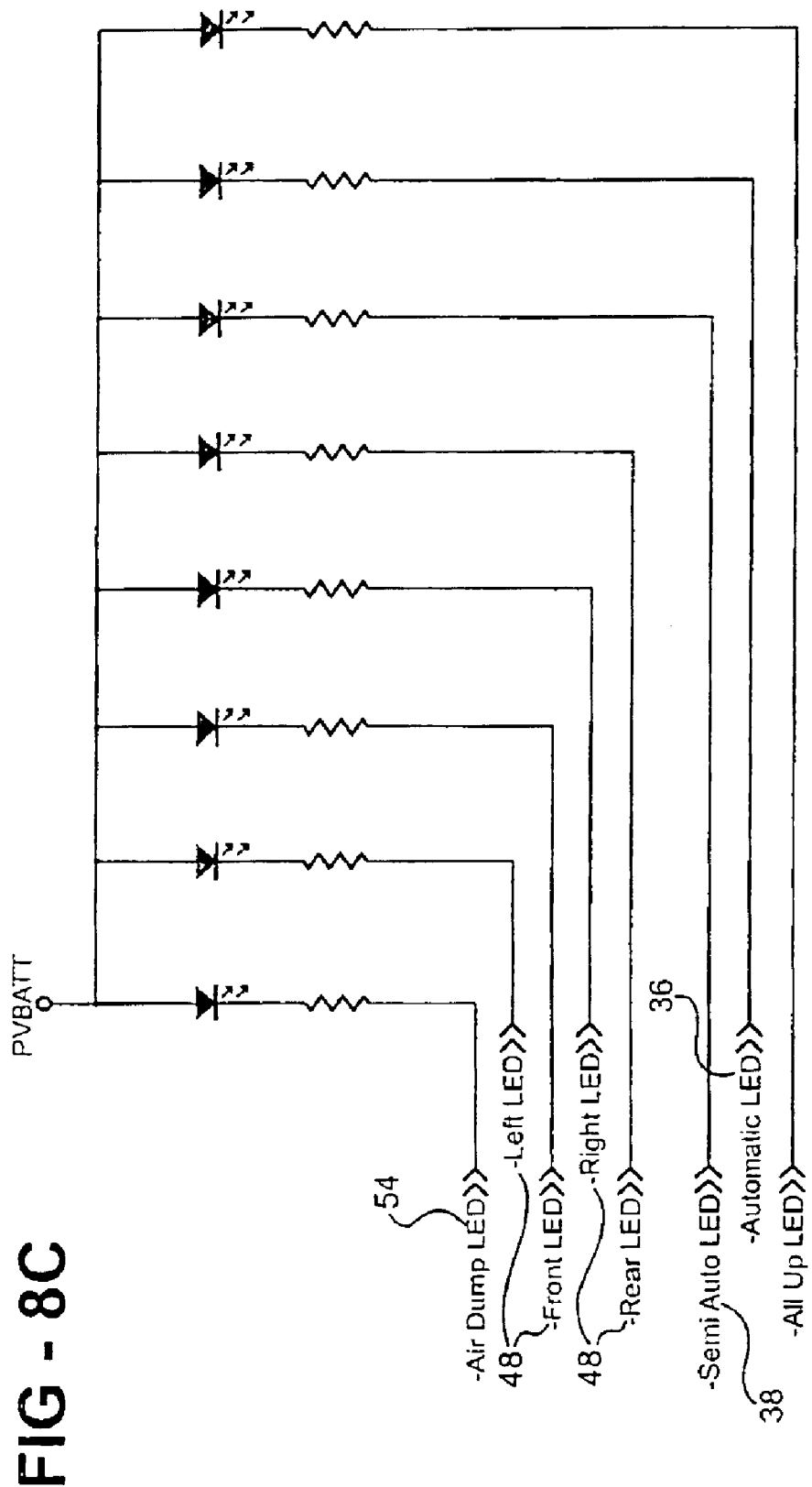
FIG. 8C is a schematic diagram showing circuitry for LED's supported on the leveler interface panel.

The circuitry that supplies regulated voltage to the microcontroller 30 and power to the output load drivers is shown in FIG. 8. Reverse battery protection is also included.

Figure 11:
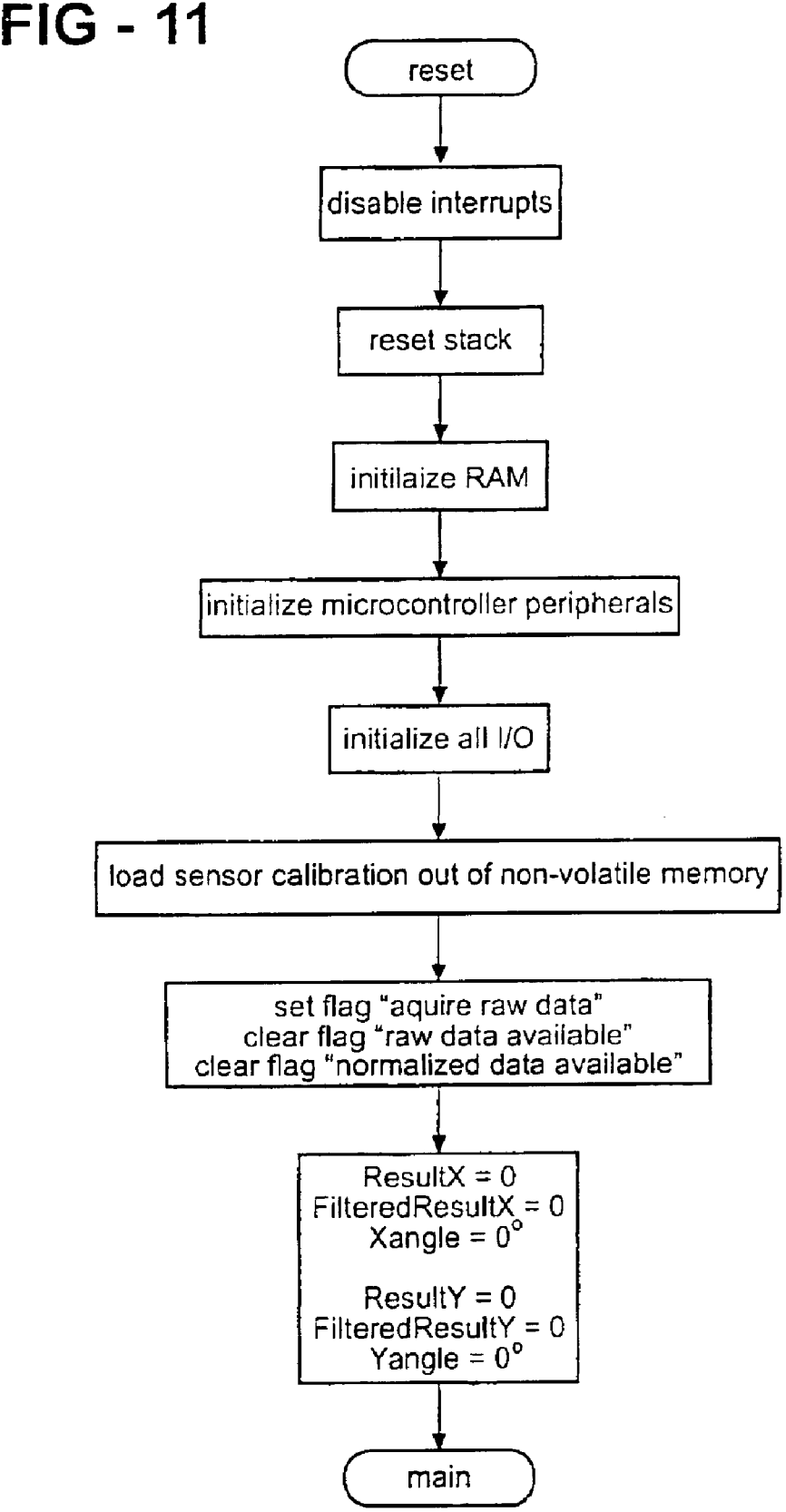
FIG. 11 is a software flowchart showing program steps for resetting the controller.
Figure 12:
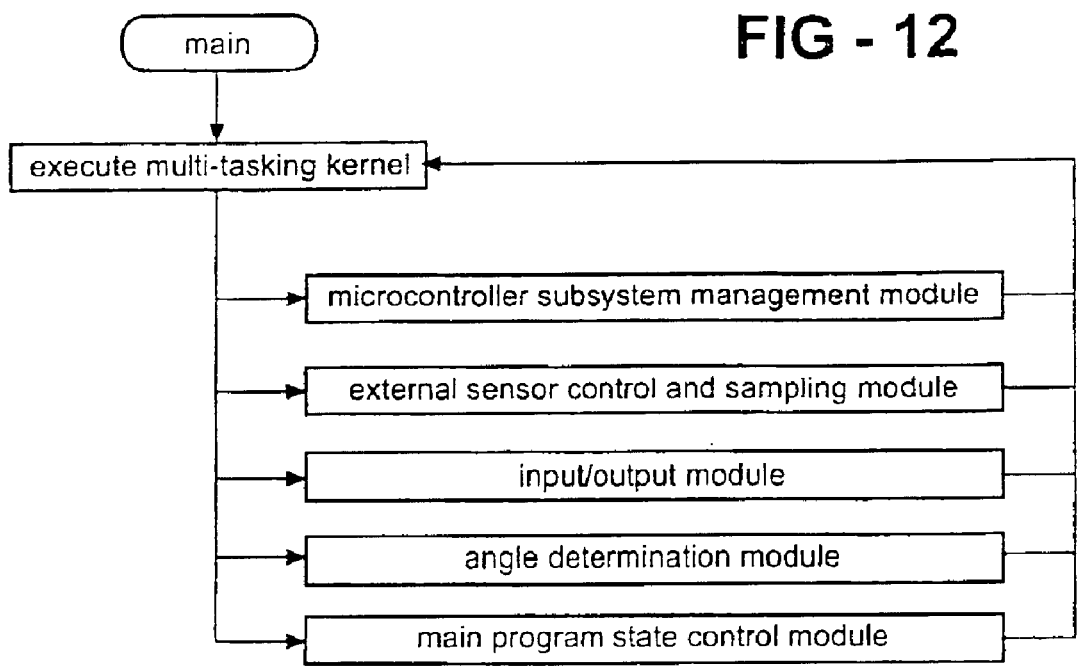
FIG. 12 is a software flowchart showing program steps for executing five modules of the main program.

Software execution and decision steps for resetting the controller 30 and for executing five modules of the main program are shown in FIGS. 11 and 12, respectively.

Figure 13:
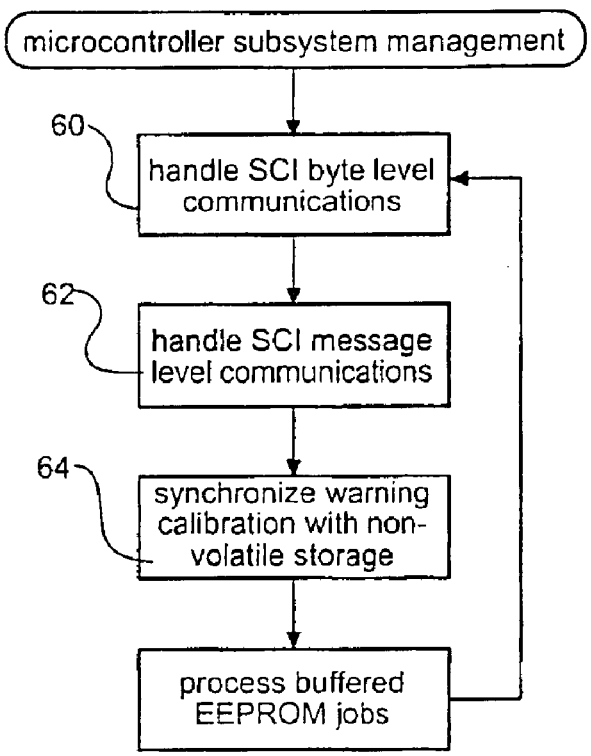
FIG. 13 is a software flowchart showing program steps for managing microcontroller subsystems.

Steps for managing microcontroller 30 subsystems are shown in FIG. 13. The execution step shown at 60 relates to SCI peripheral operation, the execution step shown at 62 handles diagnostic and configuration commands and the execution step shown at 64 ensures that calibration is always stored in non-volatile RAM.

Figure 14A:
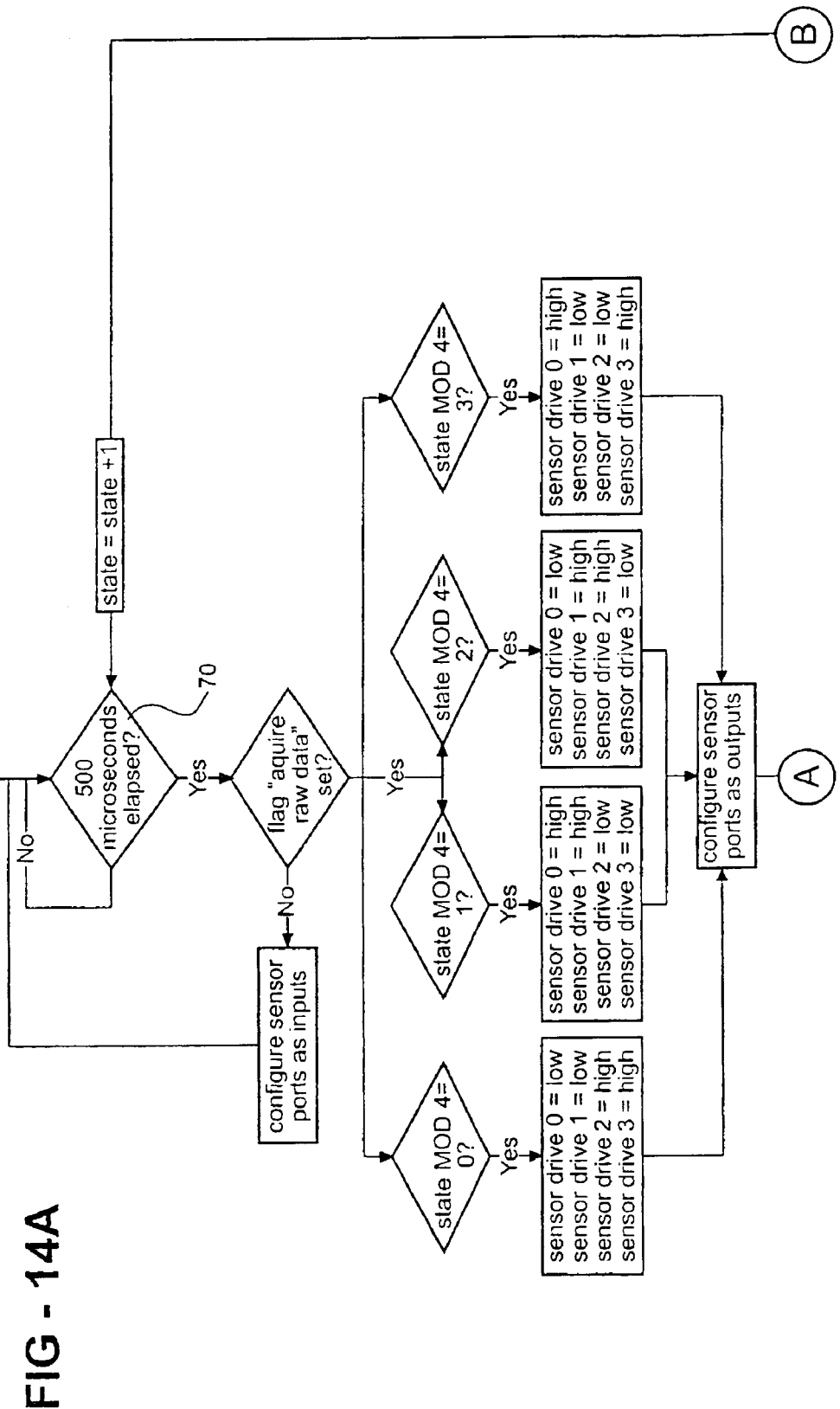
FIG. 14 is a software flowchart showing program steps for a module that controls and samples external sensors.
Figure 14B:
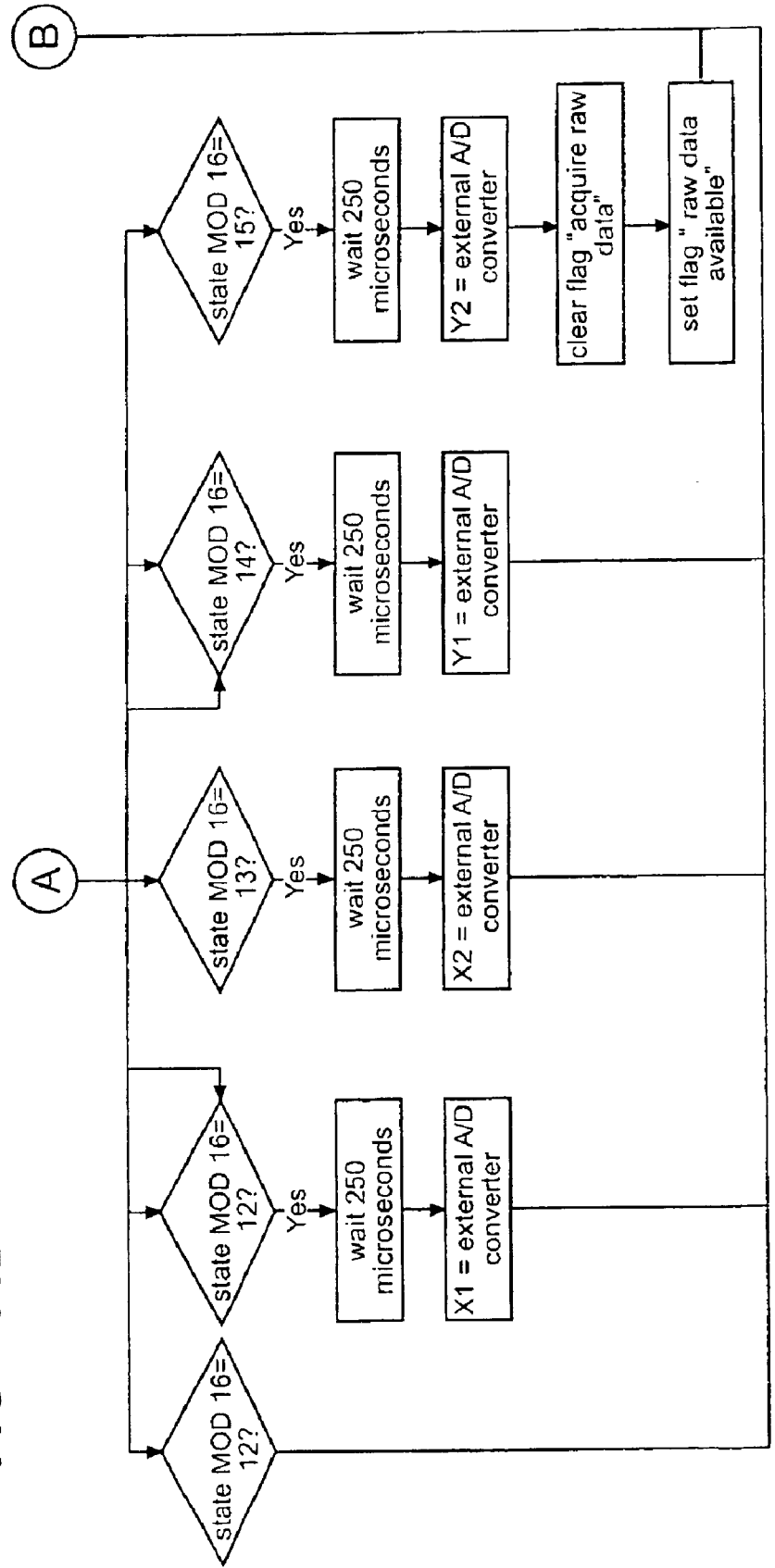

Steps for a module that controls and samples external sensors are shown in FIG. 14. The decision step shown at 70 ensures that changes to signals driving external sensors are spaced exactly 500 microseconds apart plus or minus an adjustment value.

Figure 15:
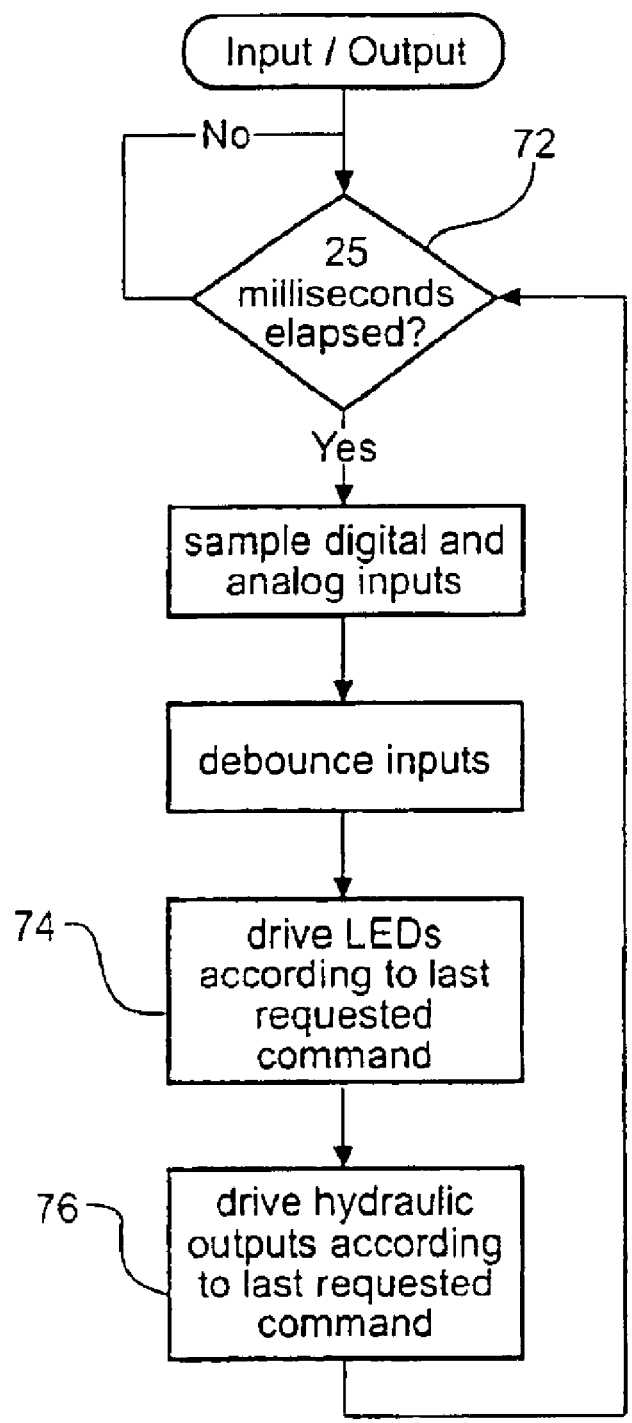
FIG. 15 is a software flowchart showing program steps for an input/output module of the main program.

Steps for an input/output module of the main program are shown in FIG. 15. The decision step shown at 72 ensures that the controller 30 samples inputs exactly once every 25 milliseconds, plus or minus an adjustment value. In accordance with the execution step shown at 74, all active LED's may blink as blinking is accounted for at this stage. The final execution block in this module, shown at 76, commands the controller 30 to "drive hydraulic outputs according to last requested command". In so doing, all active hydraulic outputs are driven at a pulse-width modulated (PWM) duty cycle calculated from real-time feedback in the main state control algorithm.

Figure 16:
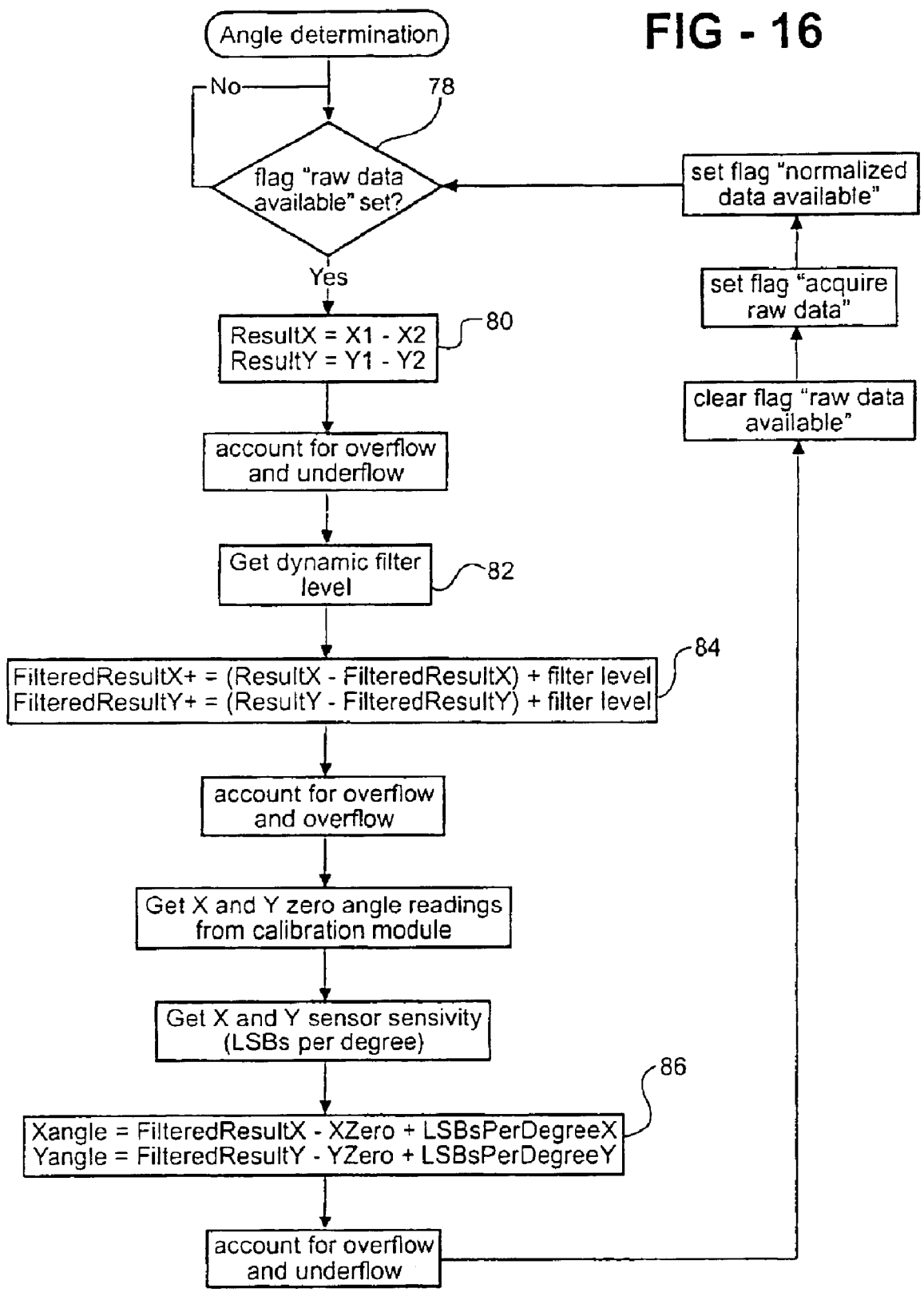
FIG. 16 is a software flowchart showing program steps for a module that determines tilt angle.

Steps for a program module that determines tilt angle are shown in FIG. 16. The decision step shown at 78 causes the controller 30 to wait until the external tilt sensor 32 has acquired new data to process. As shown in the execution step shown at 80, tilt angle is proportional to a voltage difference across the tilt sensor 32.

As shown in the execution step shown at 82, sensor filtering is dynamic and allows real-time feedback according to system response. At various times, when the unit is either at rest or in motion, the controller estimates a signal to noise ratio from the output of the tilt sensors. When the ratio is small, i.e., the noise level is high, the filter coefficients are increased. When the noise is low, the filter coefficients are decreased which makes the unit more responsive to changes.

According to the execution step shown at 84, raw sensor readings ResultX and ResultY are filtered using an ideal RC filter that is implemented via software. The execution step shown at 86 determines the actual tilt of the tilt sensor 32 in X and & axes.

Figure 20:
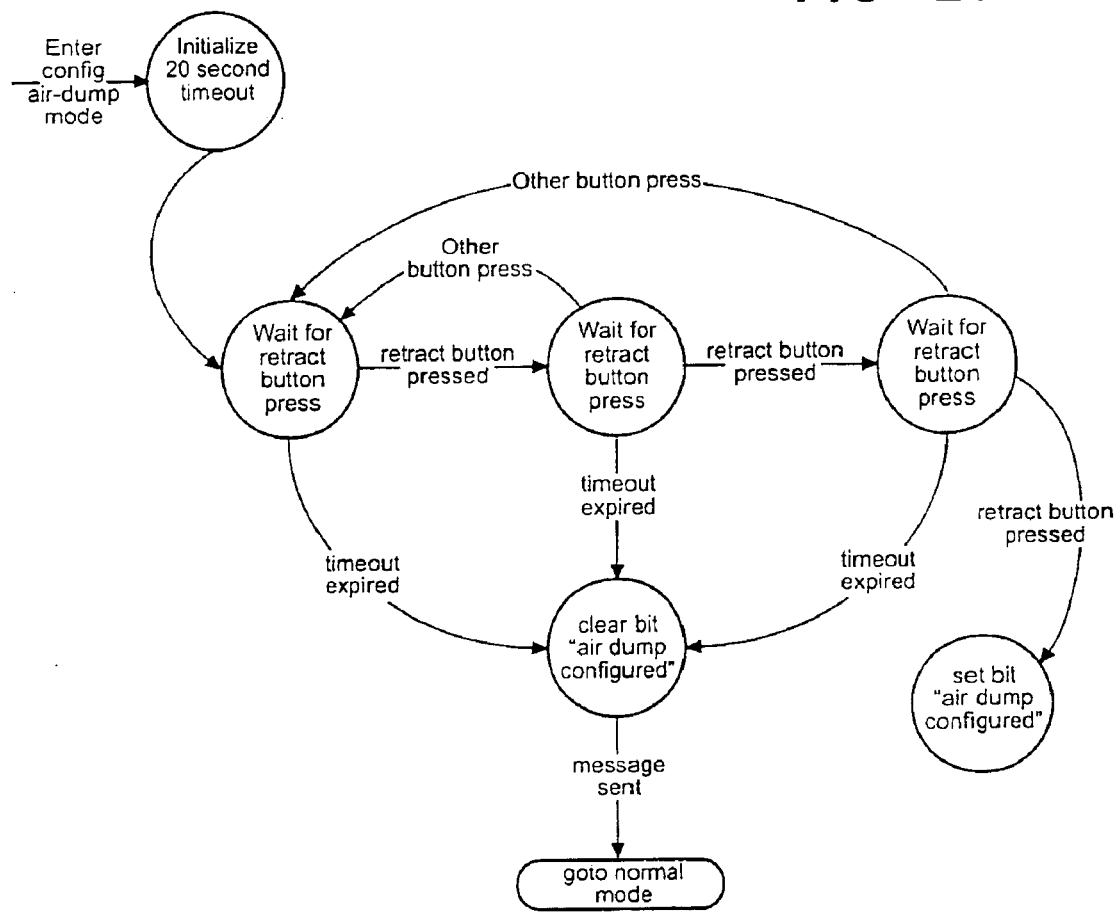
FIG. 20 is a state diagram showing a "configure air dump" mode of the controller.

Execution steps for a module that controls main program state are shown in FIG. 17. As shown, the controller 30 enters the calibration mode from the main program state control module and proceeds to the normal mode following a valid EEPROM calibration, sensitivity calibration, zero point calibration and air-dump configuration (either on or off). The flowchart of FIG. 18 details software execution steps for the calibration mode after an invalid EEPROM calibration. The flowcharts of FIGS. 19 and 20 show software execution steps for the "zero" and "configure air dump" modes, respectively.

FIG. 21 is a flowchart depicting execution steps for the normal (automatic or semi-automatic) mode of the controller 30 from mode entry through extension of front hydraulics to initially ground the front levelers. FIG. 22 is a continuation of the leveler grounding sequence of FIG. 21. Details of software execution and decision steps for the semi-automatic and automatic leveling sequence options of the normal mode are shown in FIGS. 23 and 24, respectively.

This is an illustrative description of the invention using words of description rather than of limitation. Obviously, many modifications and variations of this invention are possible in light of the above teachings and one may practice the invention other than as described.

What is claimed is:

1. An assembly for adjusting the attitude of any selected portion of a structure, the assembly comprising:

a controller configured to connect to and control one or more jacks operable to change the attitude of a structure; and a proportional tilt sensor connected to the controller and configured to be supported on the structure, the tilt sensor being configured to provide signals to the controller that represent the degree of longitudinal pitch and lateral roll of a portion of the structure the sensor is connected to, the controller being additionally configured to move any selected portion of the structure into a desired attitude by commanding movement of the entire structure into an attitude where the tilt sensor signals match any one of a number of different pre-set reference values corresponding to different desired attitudes of the selected portion of the structure.

2. An assembly as defined in claim 1 in which the signals are analog signals.

3. An assembly as defined in claim 1 in which each of the reference values is defined by a set of tilt sensor signal values that the controller recognizes as indicating that the selected portion of the structure is in a desired attitude.

4. An assembly as defined in claim 1 in which the controller is configured to detect jack ground contact from a change in tilt angle.

5. An assembly for adjusting the attitude of any selected portion of a structure, the assembly comprising:

a controller configured to connect to and control one or more jacks operable to change the attitude of a structure;

a proportional tilt sensor connected to the controller and configured to be supported on the structure, the tilt sensor being configured to provide signals to the controller, which represent the degree of longitudinal pitch and lateral roll of the portion of the structure the sensor is supported on, the controller being configured to move any selected portion of the structure into a desired attitude by commanding movement of the entire structure into an attitude where the tilt sensor signals match any one of a number of different pre-set reference values corresponding to different desired attitudes of selected portions of the structure, thereby allowing any portion of the structure to be corrected to any desired attitude within a range of attitudes despite the location of the tilt sensor and allowing the tilt sensor to be located anywhere in the structure; and a reference value selector connected to the controller and configured to transmit operator inputs to the controller, the controller being configured to select between the pre-set reference values in response to inputs received from the reference value selector.

6. An assembly as defined in claim 5 in which the controller is configured to change drive rates of the jacks based upon inputs other than tilt angle.

7. An assembly as defined in claim 5 in which the controller is configured to tailor drive rates of the jacks to respond to structural dynamics.

8. An assembly as defined in claim 5 in which the controller is configured to change drive rates of the jacks dynamically to control an attitude correction rate of the structure.

9. An assembly as defined in claim 5 in which the controller is configured to measure jack drive rates and attitude change speed of the structure using inputs from the tilt sensor.

10. An assembly as defined in claim 5 in which the controller is configured to automatically select between different jack grounding procedures, the selection being based on conditions of the structure.

11. An assembly as defined in claim 5 in which the controller is configured to infer jack ground contact based on dynamic information received from the tilt sensor and indicating jack loading.

12. An assembly as defined in claim 5 in which the controller is configured to automatically select between alternative leveling algorithms, the selection being based on conditions of the structure.

13. An assembly as defined in claim 5 in which:

the assembly includes at least two pairs of jacks supported on the structure; and the controller is configured to correct the attitude of a structure by extending the jacks in pairs parallel to longitudinal pitch and lateral roll axes of the structure.

14. An assembly as defined in claim 5 in which the controller is configured to detect and correct whichever of the pitch and roll of the structure requires the most correction to move the structure into a desired attitude.

15. An assembly as defined in claim 5 in which the controller is configured to maximize signal stability by employing adaptive filtering based on rate of angular change and estimated signal noise.

16. An assembly as defined in claim 5 in which the controller is configured to allow an operator to choose between fully automatic or semi automatic attitude correction operations.

17. An assembly as defined in claim 5 in which the controller is configured to automatically correct long-term attitude changes that occur after attitude correction.

18. A method for calibrating an attitude correction assembly to recognize when a selected portion of a structure the assembly is installed on is in a desired attitude relative to gravity; the method comprising the steps of:

providing a structure including jacks actuable to change the attitude of the structure;

providing an attitude correction assembly on the structure, the assembly including a controller and a tilt sensor;

actuating the jacks until the structure is in a first desired attitude;

providing an input to the controller indicating that the current set of signals being received from the tilt sensor is a first set of signal values that will represent the first desired attitude for the controller to reference when selected in future attitude correction operations;

actuating the jacks until the structure is in a second desired attitude relative to gravity; and providing an input to the controller indicating that the current set of signals being received from the tilt sensor is a second set of signal values that will represent the second desired attitude for the controller to reference when selected in future attitude correction operations.

19. The method of claim 18 in which the step of providing an attitude correction assembly includes providing a controller programmed to include a zero mode in which the controller is ready to receive a signal that will instruct the controller to recognize signal values being received from the tilt sensor as indicating that a selected portion of the structure is in a desired attitude.

20. The method of claim 18 including the additional steps of:

providing an attitude indicator on the selected portion of the structure, the attitude indicator configured to indicate attitude relative to gravity;

actuating the jacks until the attitude indicator indicates that the selected portion of the structure is in a desired attitude relative to gravity; and causing the controller to store signal values that the controller receives from the tilt sensor once the structure is in the desired attitude.

* * * * *

UNITED STATES PATENT AND TRADEMARK OFFICE
CERTIFICATE OF CORRECTION

PATENT NO. : 6,885,924 B2 Page 1 of 1
APPLICATION NO. : 10/318820
DATED : April 26, 2005
INVENTOR(S) : Robert M. Ford et al.

It is certified that error appears in the above-identified patent and that said Letters Patent is hereby corrected as shown below:

On the Title Page:

In the Item [57] Abstract, line 2, After "any selected portion" insert --of--.

In the Drawings:

FIG. 19: Dotted line present under "Readings Stable" should be deleted.

In the Specification:

Column 1, line 32, After "the four" delete "comers" insert --corners--.
Column 2, line 17, After "selected portion" insert --of--.
Column 3, line 17, After "FIG. 1 is" insert --a--.
Column 4, line 10, After "a portion of the" delete "a".
Column 4, line 24, After "point or attitude" delete "is" insert --as--.
Column 7, line 40, After "the controller 30" delete "tops" insert --stops--.
Column 12, line 5, After "leveled in all" delete "axis" insert --axes--.
Column 12, line 35, After "the low end of" insert --the--.
Column 13, line 42, After "end of the vehicle causes" insert --the--.
Column 14, line 1, After "indicator may then" insert --be--.
Column 14, line 54, After "tester" delete "???"
Column 17, line 54, After "and" delete "&" insert --Y--

Signed and Sealed this

Twentieth Day of February, 2007

JON W. DUDAS
*Director of the United States Patent and Trademark Office*